US009612352B2

(12) United States Patent
Alshuhail et al.

(10) Patent No.: US 9,612,352 B2
(45) Date of Patent: Apr. 4, 2017

(54) MACHINES, SYSTEMS, AND METHODS FOR SUPER-VIRTUAL BOREHOLE SONIC INTERFEROMETRY

(71) Applicants: Saudi Arabian Oil Company, Dhahran (SA); King Fahd University of Petroleum and Minerals, Dhahran (SA)

(72) Inventors: Abdulrahman Alshuhail, Dhahran (SA); Ali Abdulhameed Aldawood, Safwa (SA); Abdullatif Al-Shuhail, Dhahran (SA)

(73) Assignees: Saudi Arabian Oil Company, Dhahran (SA); King Fahd University of Petroleum and Minerals, Dhahran (SA)

(*) Notice: Subject to any disclaimer, the term of this patent is extended or adjusted under 35 U.S.C. 154(b) by 785 days.

(21) Appl. No.: 13/852,344

(22) Filed: Mar. 28, 2013

(65) Prior Publication Data

US 2013/0261976 A1    Oct. 3, 2013

Related U.S. Application Data

(60) Provisional application No. 61/618,198, filed on Mar. 30, 2012.

(51) Int. Cl.
G01V 1/48    (2006.01)

(52) U.S. Cl.
CPC .......... *G01V 1/48* (2013.01); *G01V 2210/125* (2013.01); *G01V 2210/322* (2013.01); *G01V 2210/675* (2013.01)

(58) Field of Classification Search
CPC ....... G01V 2210/125; G01V 2210/322; G01V 2210/675; G01V 1/48

(Continued)

(56) References Cited

U.S. PATENT DOCUMENTS 6,747,915 B2    6/2004  Calvert
7,447,115 B2    11/2008 Ferber et al.
(Continued)

OTHER PUBLICATIONS

Wapenaar, Kees, et al., Tutorial on Seismic Interferometry: Part 1 Basic Principles and Applications, Geophysics, Society of Exploration Geophysicists, US, vol. 75, No. 5, Sep. 1, 2010, pp. 75A195-75A209.

(Continued)

*Primary Examiner* — Alexander Satanovsky
*Assistant Examiner* — Lina Cordero
(74) *Attorney, Agent, or Firm* — Bracewell LLP; Constance G. Rhebergen; Christopher L. Drymalla

(57) ABSTRACT

Embodiments of super-virtual borehole sonic interferometry include machines, systems, and methods that can increase the signal-to-noise ratio of sonic log waveforms. Embodiments include performing a common shot gather and recording traces with a sonic tool, repositioning the tool and performing another common-shot gather; cross-correlating each trace with neighboring corresponding traces for each common shot gather, which leads to creating the virtual trace response due to a redatumed virtual source; stacking the common virtual traces with common ray paths for different common shot gathers; convolving the virtual traces with an actual trace that travels from the source through the virtual source to a receiver on the tool; and stacking the traces having common ray paths. The resulting waveforms can have a signal-to-noise ratio significantly greater than the signal-to-noise ratio of the original waveforms, due to the two stacking operations following each redatuming step.

16 Claims, 14 Drawing Sheets

(58) Field of Classification Search
USPC .......................................................... 702/11
See application file for complete search history.

(56) References Cited

U.S. PATENT DOCUMENTS

| | | |
|---|---|---|
| 7,706,211 B2 | 4/2010 | Bakulin et al. |
| 7,804,740 B2 | 9/2010 | Ferber et al. |
| 2007/0104028 A1 | 5/2007 | Van Manen |
| 2007/0183259 A1* | 8/2007 | Yogeswaren ............ G01V 1/44 367/25 |
| 2009/0302849 A1 | 12/2009 | Vasconcelos et al. |
| 2009/0310443 A1* | 12/2009 | Lou ......................... G01V 1/42 367/59 |
| 2010/0139927 A1 | 6/2010 | Bakulin et al. |
| 2010/0284250 A1 | 11/2010 | Cornish et al. |
| 2010/0286922 A1 | 11/2010 | Poletto |
| 2011/0130967 A1 | 6/2011 | Bakulin |
| 2011/0295510 A1 | 12/2011 | Gulati |
| 2012/0053839 A1 | 3/2012 | Kugler |
| 2014/0195188 A1* | 7/2014 | Donderici ............... G01V 1/48 702/103 |

OTHER PUBLICATIONS

International Search Report and Written Opinion, PCT/US2013/034237, mailed Dec. 11, 2013.

* cited by examiner

MACHINES, SYSTEMS, AND METHODS FOR SUPER-VIRTUAL BOREHOLE SONIC INTERFEROMETRY

PRIORITY

This application claims priority to U.S. Provisional Patent Application No. 61/618,198 titled "Super-Virtual Borehole Sonic Interferometry," filed on Mar. 30, 2012, the disclosure of which is incorporated herein by reference in its entirety.

BACKGROUND OF THE INVENTION

Field of the Invention

Embodiments of the present invention relate in general to evaluating subterranean geophysical formations in the industry of mineral exploration and recovery, and in particular to machines, systems, and methods for sonic logging to evaluate geophysical formations.

Description of the Related Art

Sonic logging can be used to characterize a geophysical formation. The process of sonic logging can involve lowering a transducer into a wellbore, generating a sound, or wavelength, so that the wavelength is refracted by the geophysical formation, and recording the refracted wavelengths by an array of receivers. The time that it takes the wavelengths to travel through the formation, which can be called the "travel time," can be used to derive the velocity of the formation. The velocity of the formation can be used to determine various characteristics of the formation.

Sonic logging can involve various types of sound energy, or wavelengths. One of the more useful types of wavelengths is the pressure wave ("p-wave"), which is a compressional or longitudinal wave. Other wavelength types include the shear wave ("s-wave"), the Rayleigh waves, Stoneley waves, and mud waves. The p-waves are generally the "first arrival" waves because they are the fastest of the wavelength types used for sonic logging and, thus, arrive at the receivers before the other types of wavelengths. The time that it takes the p-waves to travel from a sound source to one or more receivers can be used to characterize the formation because the velocity of the p-wave depends on the properties of the geophysical formation. Density, porosity, fluid presence, and fluid type each predictably affect the velocity of the p-wave through the formation.

SUMMARY OF THE INVENTION

Conventional sonic logs can be used to evaluate a geophysical formation, but they are often unreliable. The conventional sonic logs are particularly unreliable when there is a low signal-to-noise ratio in the sonic waveforms. Conditions in the borehole are far from optimal for recording the refracted waves, thus contributing to low signal-to-noise ratios. Washouts and irregularities in the borehole wall cause low signal transmission to the formation resulting in weak arrivals of refracted waveforms (low signal-to-noise ratio). The signal recorded could be contaminated with noise due to a number of different reasons. Such signal contamination can accumulate and obstruct the identification of signals, which will result in errors in estimating formation velocities. Therefore, it would be helpful to increase the signal-to-noise ratio.

Embodiments of super-virtual borehole sonic interferometry include methods and systems that can increase the signal-to-noise ratio of sonic log waveforms. An embodiment of the technique, for example, can include (1) cross-correlating each trace with neighboring corresponding traces for a common shot, which leads to creating the virtual trace response due to a redatumed virtual source; (2) stacking the common virtual traces with common ray paths for different shots; (3) convolving the virtual traces with an actual trace that travels from the source through the virtual source to a receiver on the tool; and (4) stacking the traces having common ray paths. The resulting waveforms can have a signal-to-noise ratio significantly greater than the signal-to-noise ratio of the original waveforms, due to the two stacking operations following each redatuming step. This is an elegant solution to the signal-to-noise problem because two stacking operations significantly increase the signal-to-noise ratio of the sonic waveforms recorded, which results in more accurate velocity estimations for reservoir evaluation.

In embodiments, after the first stacking operation, the virtual trace obtained can be convolved with an actual trace that has a ray path that terminates where the virtual trace is starting. The convolution can be applied over different virtual source positions, and the redatumed event can have the source and the receiver located at the sonic tool. Therefore, the output can be a trace that has the same source and receiver locations as one or more of the original shot gathers, but a better signal-to-noise ratio.

By increasing the signal, relative to the noise, embodiments of methods and apparatuses of super-virtual borehole sonic interferometry can accurately transform the refracted wavelengths into a useful display and data output representing properties of the geophysical formation. The display and data output can then be used to more accurately evaluate a geophysical formation.

Embodiments of a computer-implemented method of evaluating geophysical formations include positioning one or more sonic tools in a first position in a wellbore. The sonic tool can have a sonic source, a first signal receiver, a second signal receiver, and a third signal receiver with the sonic source spaced axially apart from each of the first, second, and third signal receivers. The first, second, and third signal receivers are spaced apart from each other by a preselected distance, and the sonic source and the first, second, and third signal receivers are in communication with one or more computers.

Embodiments of a computer-implemented method of evaluating geophysical formations include generating a plurality of sonic waves, that each have a predetermined wavelength, from the sonic source. The one or more computers can determine one or more first real traces for each of the first, second, and third signal receivers. The one or more first real traces are data representing a first plurality of refracted wavelengths received by each of the first, second, and third signal receivers received from the sonic source and located at a first location of each of the first, second, and third signal receivers. Each of the plurality of refracted wavelengths can travel along one of a plurality of first real ray paths from the sonic source, through an associated geophysical formation to one or more refractors within the associated geophysical formation, and then to one of the first, second, and third signal receivers.

Embodiments of a computer-implemented method of evaluating geophysical formations include determining, by the computer, one or more first-shot first virtual traces, each virtually originating from a first-shot first virtual wavelength source having a virtual location in the associated geophysical formation proximate to the first location of the first signal receiver. The computer determines this by cross-correlating the one or more first real traces of the first signal receiver with the one or more first real traces of the second and third signal receivers.

Embodiments of a computer-implemented method of evaluating geophysical formations include determining, by the computer, one or more first-shot second virtual traces, each virtually originating from a first-shot second virtual wavelength source having a virtual location in the associated geophysical formation proximate to the first location of the second signal receiver by cross-correlating the one or more first real traces of the second signal receiver with the one or more first real traces of the third signal receiver Embodiments of a computer-implemented method of evaluating geophysical formations include repositioning the sonic tool axially in the wellbore by at least the preselected distance, The preselected distance can be equal to the distance between each of the first, second, and third signal receivers. The computer can determine a second real trace for each of the first, second, and third signal receivers, the second real traces being data representing a second plurality of refracted wavelengths received by each of the first, second, and third signal receivers from the sonic source and located at a second location of each of the first, second, and third signal receivers. Each of the second plurality of refracted wavelengths can travel along one of a plurality of second real ray paths from the sonic source, through the associated geophysical formation, to one or more of the refractors within the associated geophysical formation, and then to one of the first, second, and third signal receivers.

Embodiments of a computer-implemented method of evaluating geophysical formations include the computer performing the steps of determining one or more second-shot first virtual traces, each virtually originating from a second-shot first virtual wavelength source having a virtual location in the associated geophysical formation proximate to the second location of the first signal receiver by cross-correlating the one or more second real traces of the first signal receiver with the one or more second real traces of the second and third signal receivers. The computer can also perform the steps of determining one or more second-shot second virtual traces, each virtually originating from a second-shot second virtual wavelength source having a virtual location in the geophysical formation proximate to the second location of the second signal receiver by cross-correlating the one or more second real traces of the second signal receiver with the one or more second real traces of the third signal receiver.

Embodiments of a computer-implemented method of evaluating geophysical formations include the computer performing the steps of identifying one or more paths from each of the virtual wavelength sources to each of the first, second, and third receivers to define a plurality of virtual ray paths. The computer can identify each of the plurality of virtual ray paths that match a portion of at least one of the first real ray paths and second real ray paths, to define a plurality of common ray paths Embodiments of a computer-implemented method of evaluating geophysical formations include the computer stacking one or more of the virtual traces and one or more of each of the first real traces and second real traces that have common ray paths to cancel out random noise during a summation of a signal portion of the one or more of the first real traces, second real traces, and virtual traces to define one or more stacked traces. The computer can perform the step of determining one or more resulting traces, each of the one or more resulting traces being configured to initiate at a location of the sonic source and end at one of the first and second locations of one of the first, second, and third signal receivers. The determining of the one or more resulting traces can include convolving one or more of the virtual traces with one or more of the first real traces and second real traces, the one or more first real traces and second real traces each having a ray path terminating at a location where the virtual trace starts, to cause a portion of at least one of the virtual traces to cancel out with a portion of at least one of the first and second real traces.

Embodiments of a computer-implemented method of evaluating geophysical formations include the computer performing the steps of stacking each of the stacked traces and resulting traces having common ray paths to define one or more representative traces, the representative traces having a representative-trace signal-to-noise ratio greater than a signal-to-noise ratio of one or more of the first and second real traces and defining a velocity of at least a portion of the geophysical formation. Exemplary embodiments of a computer-implemented method of evaluating geophysical formations include displaying the one or more representative traces on a display in communication with the one or more computers to indicate one or more densities of the geophysical formation to indicate whether hydrocarbons are present in the geophysical formation.

In embodiments of a computer-implemented method of evaluating geophysical formations, each of the one or more first real traces for each of the first, second, and third signal receivers begins at a time $T_A$, and each of the one or more virtual traces for each of the first-shot first and second virtual wavelength sources begins at one or more times $T_B$. In these embodiments, $T_B - T_A = T_X$, and $T_X$ is the time it takes one or more of the plurality of signals to travel from the sonic source to one of the first and second virtual wavelength sources.

In embodiments of a computer-implemented method of evaluating geophysical formations, the cross-correlation step can use the formula:

$$r_{virtual} = r_k(t) \otimes r_j(t) = \int_{-\infty}^{\infty} r_j(\tau) r_k(t+\tau) d\tau$$

In this formula, $r_{virtual}$=one of the first-shot first virtual wavelength source and the first-shot second virtual wavelength source prior to the step of repositioning the sonic tool in the wellbore, and one of the second-shot first virtual wavelength source and the second-shot second virtual wavelength source after the step of repositioning the sonic tool in the wellbore. In this formula, $r_k$=the number of one of the first and second signal receivers; $r_j$=the number of one of another one of the second signal receiver and the third signal receiver; t=time; and τ=a placeholder representing a negative time. Negative time is the time it takes the refracted wavelength to travel from one or more of the first, second, and third receivers to one or more of the refractors in the formation.

In embodiments of a computer-implemented method of evaluating geophysical formations, the step of convolving each of the stacked traces can include calculating the resulting trace from the formula:

$$r_k(t) * r_{virtual}(t) = \int_{-\infty}^{\infty} r_k(\tau) r_{virtual}(t-\tau) d^2\tau$$

In this formula, $r_k$=the number of one of the first and second signal receivers; $r_{virtual}$=the number of one of the first-shot first virtual wavelength source and the first-shot second virtual wavelength source prior to repositioning the sonic tool in the wellbore and one of the second-shot first virtual wavelength source and the second-shot second virtual wavelength source after repositioning the sonic tool in the wellbore; t=time; and τ=a placeholder representing a negative time, the negative time being the time it takes the refracted wavelength to travel from one or more of the first, second, and third receivers to one or more of the refractors in the formation.

Embodiments of a system to evaluate geophysical formations using super-virtual borehole sonic interferometry can include one or more sonic tools that each include a sonic source, a first signal receiver, a second signal receiver, and a third signal receiver. The sonic source can be axially spaced apart from each of the first, second, and third signal receivers. The first, second, and third signal receivers can be spaced apart from each other by a preselected distance, and the sonic source and the first, second, and third signal receivers can be in communication with a computer. The sonic source is adapted to generate a plurality of sonic waves each having a predetermined wavelength. Exemplary embodiments can also include a positioner connected to the sonic tool can position the sonic tool in a wellbore.

Embodiments of a system to evaluate geophysical formations using super-virtual borehole sonic interferometry can include a machine in communication with the first, second, and third signal receivers. The machine can have one or more processors, a display in communication with the one or more processors, and non-transitory, computer-readable memory having one or more executable programs stored therein and being operable with the one or more processors, the one or more programs instructing the one or more processors to perform steps as described, below.

In embodiments of a system to evaluate geophysical formations using super-virtual borehole sonic interferometry, the one or more executable programs can instruct the one or more processors to perform the steps of determining one or more first real traces for each of the first, second, and third signal receivers. The one or more first real traces can be data representing a first plurality of refracted wavelengths received by each of the first, second, and third signal receivers received from the sonic source and located at a first location of each of the first, second, and third signal receivers. Each of the plurality of refracted wavelengths travels along one of a plurality of first real ray paths from the sonic source, through an associated geophysical formation to one or more refractors within the associated geophysical formation, and then to one of the first, second, and third signal receivers.

In embodiments of a system to evaluate geophysical formations using super-virtual borehole sonic interferometry, the executable program or programs can instruct the one or more processors to perform the steps determining a first-shot first virtual wavelength source having a virtual location in the associated geophysical formation proximate to the first location of the first signal receiver by cross-correlating the one or more first real traces of the first signal receiver with the one or more first real traces of the second and third signal receivers. The executable program or programs can also instruct the one or more processors to determine a first-shot second virtual wavelength source having a virtual location in the associated geophysical formation proximate to the first location of the second signal receiver by cross-correlating the one or more first real traces of the second signal receiver with the one or more first real traces of the third signal receiver.

In embodiments of a system to evaluate geophysical formations using super-virtual borehole sonic interferometry, the executable program or programs can instruct the one or more processors to perform the steps determining a second real trace for each of the first, second, and third signal receivers, the second real traces being data representing a second plurality of refracted wavelengths received by each of the first, second, and third signal receivers from the sonic source and located at a second location of each of the first, second, and third signal receivers. Each of the second plurality of refracted wavelengths travels along one of a plurality of second real ray paths from the sonic source, through the associated geophysical formation to one or more of the refractors within the associated geophysical formation, and then to one of the first, second, and third signal receivers.

In embodiments of a system to evaluate geophysical formations using super-virtual borehole sonic interferometry, the executable program or programs can instruct the one or more processors to perform the steps determining a second-shot first virtual wavelength source having a virtual location in the associated geophysical formation proximate to the second location of the first signal receiver by cross-correlating the one or more second real traces of the first signal receiver with the one or more second real traces of the second and third signal receivers.

In embodiments of a system to evaluate geophysical formations using super-virtual borehole sonic interferometry, the executable program or programs can instruct the one or more processors to perform the steps determining a second-shot second virtual wavelength source having a virtual location in the geophysical formation proximate to the second location of the second signal receiver by cross-correlating the one or more second real traces of the second signal receiver with the one or more second real traces of the third signal receiver.

In embodiments of a system to evaluate geophysical formations using super-virtual borehole sonic interferometry, the executable program or programs can instruct the one or more processors to perform the steps of establishing one or more virtual traces for each of the first-shot and second-shot first and second virtual wavelength sources. The one or more virtual traces can be data representing a plurality of virtual refracted wavelengths originating, virtually, from one or more of the first and second virtual wavelength sources and received, virtually, by one or more of the first, second, and third signal receivers. The executable program or programs can also instruct the one or more processors to perform the steps of identifying one or more paths from each of the virtual wavelength sources to each of the first, second, and third receivers to define a plurality of virtual ray paths, and then identifying each of the plurality of virtual ray paths that match a portion of at least one of the first real ray paths and second real ray paths, to define a plurality of common ray paths. The executable program or programs can also instruct the one or more processors to perform the steps of stacking one or more of the virtual traces and one or more of each of the first real traces and second real traces that have common ray paths to cancel out random noise during a summation of a signal portion of the virtual traces to define a stacked trace.

In embodiments of a system to evaluate geophysical formations using super-virtual borehole sonic interferometry, the executable program or programs can instruct the one or more processors to perform the steps of determining one or more resulting traces, each of the one or more resulting traces being configured to initiate at a location of the sonic source and end at one of the first and second locations of one of the first, second, and third receivers. The determining of the one or more resulting traces can include convolving each of the stacked traces with each of the first, second, and third signal receivers to thereby correspond to each of the stacked traces so that each of the virtual traces and each of the first real traces and second real traces having a ray path terminating at a location where the virtual trace starts. This step can cause a portion of one of the virtual traces to cancel out with a portion of at least one of the first and second real traces.

In embodiments of a system to evaluate geophysical formations using super-virtual borehole sonic interferometry, the executable program or programs can instruct the one or more processors to perform the steps stacking each of the resulting traces having common ray paths to define one or more representative traces. The representative traces can have a representative-trace signal-to-noise ratio greater than a signal-to-noise ratio of one or more of the first and second real traces and defining a velocity of at least a portion of the geophysical formation. The system can display the one or more representative traces on the display to indicate one or more densities of the geophysical formation to indicate whether hydrocarbons are present in the geophysical formation.

In embodiments of a machine to evaluate geophysical formations using super-virtual borehole sonic interferometry, the machine can include one or more processors, one or more displays in communication with the one or more processors, and non-transitory, computer-readable storage media with one or more executable programs stored therein. In embodiments of the machine, the one or more programs can instruct the one or more processors to perform the steps of determining one or more first real traces for each of a first, second, and third signal receiver. The one or more first real traces can be data representing a first plurality of refracted wavelengths received by each of the first, second, and third signal receivers received from a sonic source and located at a first location of each of the first, second, and third signal receivers. Each of the plurality of refracted wavelengths can travel along one of a plurality of first real ray paths from the sonic source, through an associated geophysical formation to one or more refractors within the associated geophysical formation, and then to one of the first, second, and third signal receivers.

In embodiments of the machine, the one or more programs can instruct the one or more processors to perform the steps of determining a first-shot first virtual wavelength source having a virtual location in the associated geophysical formation proximate to the first location of the first signal receiver by cross-correlating the one or more first real traces of the first signal receiver with the one or more first real traces of the second and third signal receivers. The one or more programs can also instruct the one or more processors to perform the steps of determining a first-shot second virtual wavelength source having a virtual location in the associated geophysical formation proximate to the first location of the second signal receiver by cross-correlating the one or more first real traces of the second signal receiver with the one or more first real traces of the third signal receiver.

In embodiments of the machine, the one or more programs can instruct the one or more processors to perform the steps of determining a second real trace for each of the first, second, and third signal receivers, the second real traces being data representing a second plurality of refracted wavelengths received by each of the first, second, and third signal receivers from the sonic source and located at a second location of each of the first, second, and third signal receivers. Each of the second plurality of refracted wavelengths can travel along one of a plurality of second real ray paths from the sonic source, through the associated geophysical formation to one or more of the refractors within the associated geophysical formation, and then to one of the first, second, and third signal receivers.

In embodiments of the machine, the one or more programs can instruct the one or more processors to perform the steps of determining a second-shot first virtual wavelength source having a virtual location in the associated geophysical formation proximate to the second location of the first signal receiver by cross-correlating the one or more second real traces of the first signal receiver with the one or more second real traces of the second and third signal receivers. The one or more programs can also instruct the one or more processors to perform the step of determining a second-shot second virtual wavelength source having a virtual location in the geophysical formation proximate to the second location of the second signal receiver by cross-correlating the one or more second real traces of the second signal receiver with the one or more second real traces of the third signal receiver.

In embodiments of the machine, the one or more programs can instruct the one or more processors to perform the steps of establishing one or more virtual traces for each of the first-shot and second-shot first and second virtual wavelength sources. The one or more virtual traces can be data representing a plurality of virtual refracted wavelengths originating, virtually, from one or more of the first and second virtual wavelength sources and received, virtually, by one or more of the first, second, and third signal receivers. The one or more programs can further instruct the one or more processors to perform the steps of identifying one or more paths from each of the virtual wavelength sources to each of the first, second, and third receivers to define a plurality of virtual ray paths. The one or more programs can further instruct the one or more processors to perform the steps of identifying each of the plurality of virtual ray paths that match a portion of at least one of the first real ray paths and second real ray paths, to define a plurality of common ray paths. The one or more programs can further instruct the one or more processors to perform the steps of stacking one or more of the virtual traces and one or more of each of the first real traces and second real traces that have common ray paths to cancel out random noise during a summation of a signal portion of the virtual traces to define a stacked trace.

In embodiments of the machine, the one or more programs can instruct the one or more processors to perform the steps of determining one or more resulting traces, each of the one or more resulting traces being configured to initiate at a location of the sonic source and end at one of the first and second locations of one of the first, second, and third receivers. The determining of the one or more resulting traces can include convolving each of the stacked traces with each of the first, second, and third signal receivers to thereby correspond to each of the stacked traces so that each of the virtual traces, and each of the first real traces and second real traces having a ray path terminating at a location where the virtual trace starts, to cause a portion of one of the virtual traces to cancel out with a portion of at least one of the first and second real traces.

In embodiments of the machine, the one or more programs can instruct the one or more processors to perform the steps of stacking each of the resulting traces having common ray paths to define one or more representative traces, the representative traces having a representative-trace signal-to-noise ratio greater than a signal-to-noise ratio of one or more of the first and second real traces and defining a velocity of at least a portion of the geophysical formation. The one or more representative traces can be displayed on the display to indicate one or more densities of the geophysical formation to indicate whether hydrocarbons are present in the geophysical formation.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to embodiments thereof which are illustrated in the attached drawings, which drawings form a part of this specification. It is to be noted, however, that the drawings illustrate only a preferred embodiment of the invention and therefore should not be considered limiting of its scope as the invention may admit to other equally effective embodiments.

DETAILED DESCRIPTION OF THE INVENTION

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Sonic logging can be used to characterize and evaluate properties of a geophysical formation. The properties can include, for example, porosity, permeability, presence of fluids, and pressure. Sonic logging relies upon the use of refracted waves to estimate the interval velocities from the travel time recorded at the receivers. Interval velocities are an indication of the time that it takes sonic waves to pass through a portion of the formation. Sonic logging includes using a sonic source to transmit sound waves, or sonic waves, through a portion of the geophysical formation. Signal receivers, which can be spaced apart from the sonic source, receive the sonic waves that are refracted by the formation. The arrival time of the refracted sonic waves can be recorded. The arrival times, and the comparison of the arrival times at two or more of the signal receivers can be used to characterize the geophysical formation.

Figure 1:
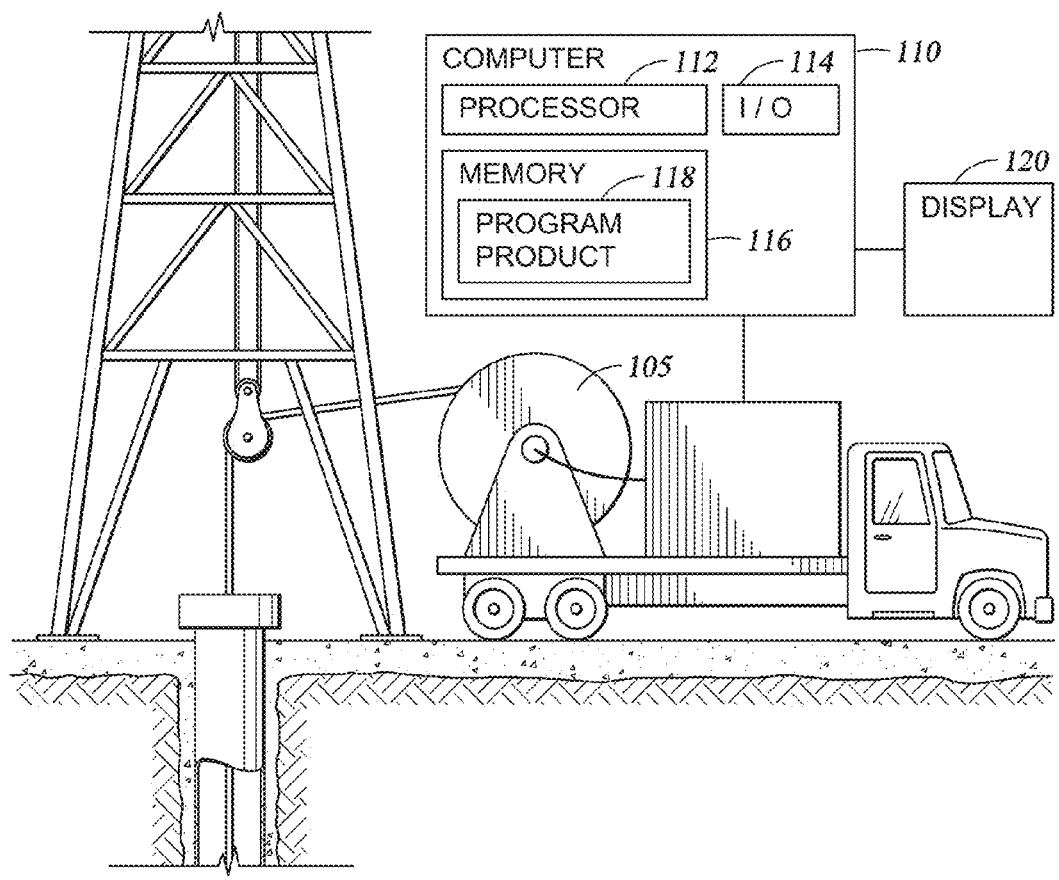
FIG. 1 is an environmental view of a sonic tool positioned in a wellbore in a geophysical formation and in data communication with a computer according to an embodiment of the present invention.
Figure 1:
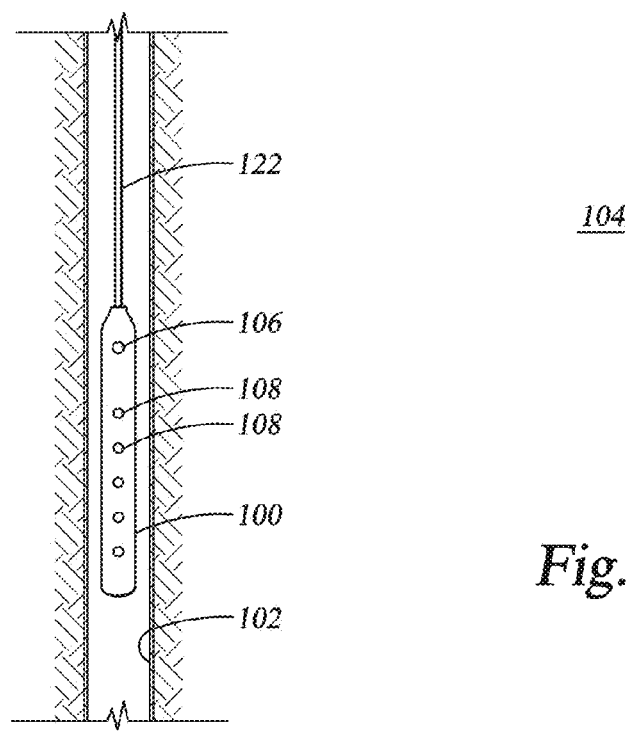

In an embodiment of super-virtual borehole sonic interferometry, a sonic tool 100 can be used to determine interval velocities, and thus characterize properties of the geophysical formation. The sonic tool 100 can be positioned in a borehole 102 located in a geophysical formation 104, as shown in FIG. 1. As one of skill in the art will appreciate, a positioner, such as a motorized spool 105 that lowers and raises cable 122, can be used to position the sonic tool 100 in the wellbore. In FIG. 1, motorized spool 105 is shown mounted on truck 107 but, as one of skill in the art will appreciate, other types of positioners can be used. For example, positioners can include hoists, cranes, rig-mounted pulleys, and tubular members such as, for example, drill string. The positioner can raise and lower sonic tool 100 by a preselected distance, and the axial distance moved can be within a predetermined margin of error.

As one of skill in the art will appreciate, the sonic tool 100 can include one or more sonic sources 106 and one or more signal receivers 108. Some embodiments can have, for example, 8-13 signal receivers 108 on one sonic tool 100, each spaced apart from one another. More or fewer signal receivers 108 can be used. Each of the signal receivers 108 can each be spaced apart from adjacent signal receivers 108 by the same preselected distance, or span. In one embodiment, the sonic source 106 can be located, for example, two or more feet away from the nearest signal receiver 108 in order to allow the refracted wave to become the first arrival. The sonic source 106 and signal receivers 108 can each be in data communication with a computer 110. The computer 110 can include various components such as, for example, one or more processors 112, one or more input/output modules 114, and computer-readable memory 116. A program product 118 can be stored by memory 116 and can cause the one or more processors 112 to perform the steps described herein. A display 120 can be in communication with computer 110. The computer 110 can be located above ground, apart from the sonic tool 100, and communicate by way of cable 122, or all or a portion of the computer 110 can be located in the sonic tool 100 housing or otherwise located downhole. Alternatively, the computer 110 and the sonic source 106 and signal receivers 108 can communicate by other techniques such as, for example, wireless, or a combination of wired and wireless communications. The sonic source 106 and signal receivers 108 can be housed in a single sonic tool 100, or they can be separate from one another. For purposes of this description, a sonic tool 100 shall refer to the sonic source 106 and signal receivers 108 that are in communication with computer 110 and adapted to function together, regardless of whether they are located in a common housing. In embodiments, both the sonic source 106 and signal receivers 108 are located in a borehole inside the earth. In embodiments, there is an absence of a signal source 106 and signal receivers 108 on or above the surface of the earth.

Embodiments of super-virtual borehole sonic interferometry can redatum the sonic source 106 or signal receivers 108 enhance the signal-to-noise ratio of the traces produced in response to the refracted waveforms received by the signal receivers 108. A source or receiver is considered "redatumed" when the source or receiver is moved, either physically or virtually, to a different location. Interferometry is a method applied to obtain a natural Green's function. Interferometry is considered a redatuming method applied to redatum sources and/or receivers using natural Green's functions (i.e. natural wavefield extrapolators). As one of ordinary skill in the art will appreciate, a "Green's Function" is a mathematical function that uses integration to solve an inhomogeneous differential equation that is subject to boundary conditions. The power of interferometry is that redatuming is done without the need to know the velocity model. In other words, the extrapolators used in the redatuming are obtained directly from the recorded data. For example, cross-correlating the traces recorded at different receivers can give a new seismic response of a virtual source placed at one of the receivers and recorded at another one of the receivers.

Figure 2:
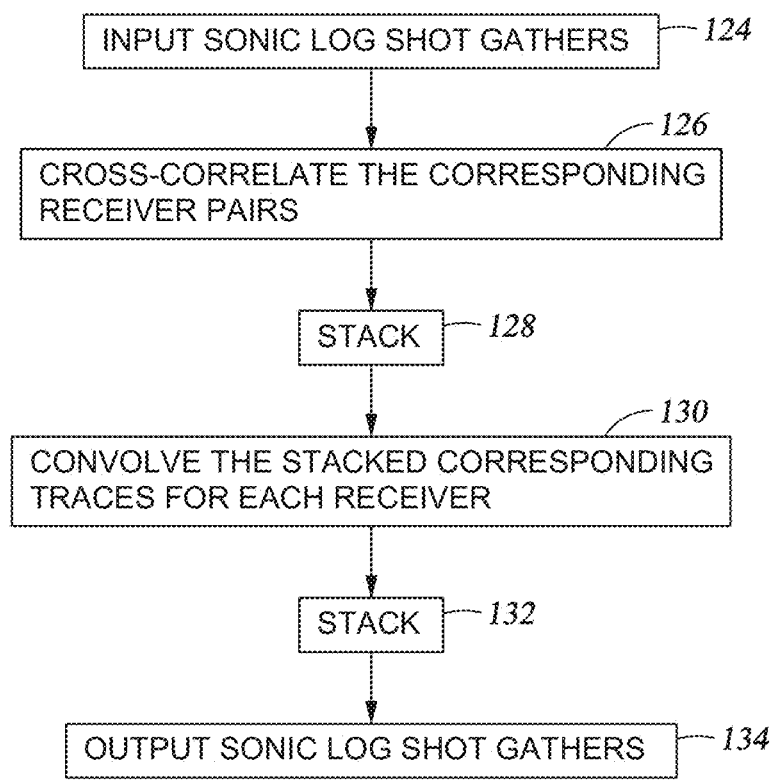
FIG. 2 is a schematic block flow diagram of a method of evaluating a geophysical formation according to an embodiment of the present invention.

An embodiment of the super-virtual borehole sonic interferometry employs a technique of borehole sonic interferometry to improve the signal-to-noise ratio for sonic logging. Embodiments of the technique shown in FIG. 2 are described as six broad steps, but more or fewer steps can be used. An overview of embodiments of FIG. 2 is presented, below, followed by a more detailed description.

1. Input Sonic Log Shot Gathers 124. Perform a first common shot gather. Move distance equal to span, perform second common shot gather.
2. Cross-Correlate the Corresponding Receiver Pairs 126. Cross correlate the real traces from the first common shot gather to determine first-shot virtual traces. Cross correlate the real traces from the second common shot gather to determine second-shot virtual traces. Identify common ray paths, which are ray paths that travel along the same path even though they may be from different sources or go to different receivers. For example, a ray path 1 could be from the sonic source to the second receiver during the first common shot gather. Ray path 2 could be from a virtual source to the third receiver as determined from the second shot gather. Ray path 1 and ray path 2 can be along the same path and, thus, be identified as common ray paths.
3. Stack 128. Stack the real and virtual traces corresponding to each of the ray paths of each set of common ray paths. This stacking operation can cancel out random noise while summing the signal portion of the corresponding real and virtual traces, and produces one or more stacked traces.
4. Convolve the Stacked Corresponding Traces for Each Receiver 130. Convolve corresponding pairs of virtual traces and real traces to cause a portion of the virtual trace and a portion of the real trace to cancel out, thus producing one or more resulting traces. Each of the resulting traces are produced from the remaining portions of each of the corresponding virtual traces and real traces. One or more of the resulting traces can have a ray path that is common with one or more ray paths of the stacked traces.
5. Stack 132. Identify the stacked traces (from step 3) and the resulting traces (from step 4) that have common ray paths, and then stack the sets of traces that correspond to the common ray paths. This second stacking operation can produce representative traces which represent one or more velocities of the formation. The signal-to-noise ratio of the representative traces is higher than the signal-to-noise ratio of the real traces and virtual traces that were considered in Steps 1-4.
6. Output Sonic Log Shot Gathers 134. The representative traces from Step 5 can be output as, for example, a display or printed copy. These representative traces can then be analyzed to determine velocities of the formation and, thus, used to characterize properties of the formation such as porosity, pressure, and the presence of hydrocarbons.

Figure 3A:
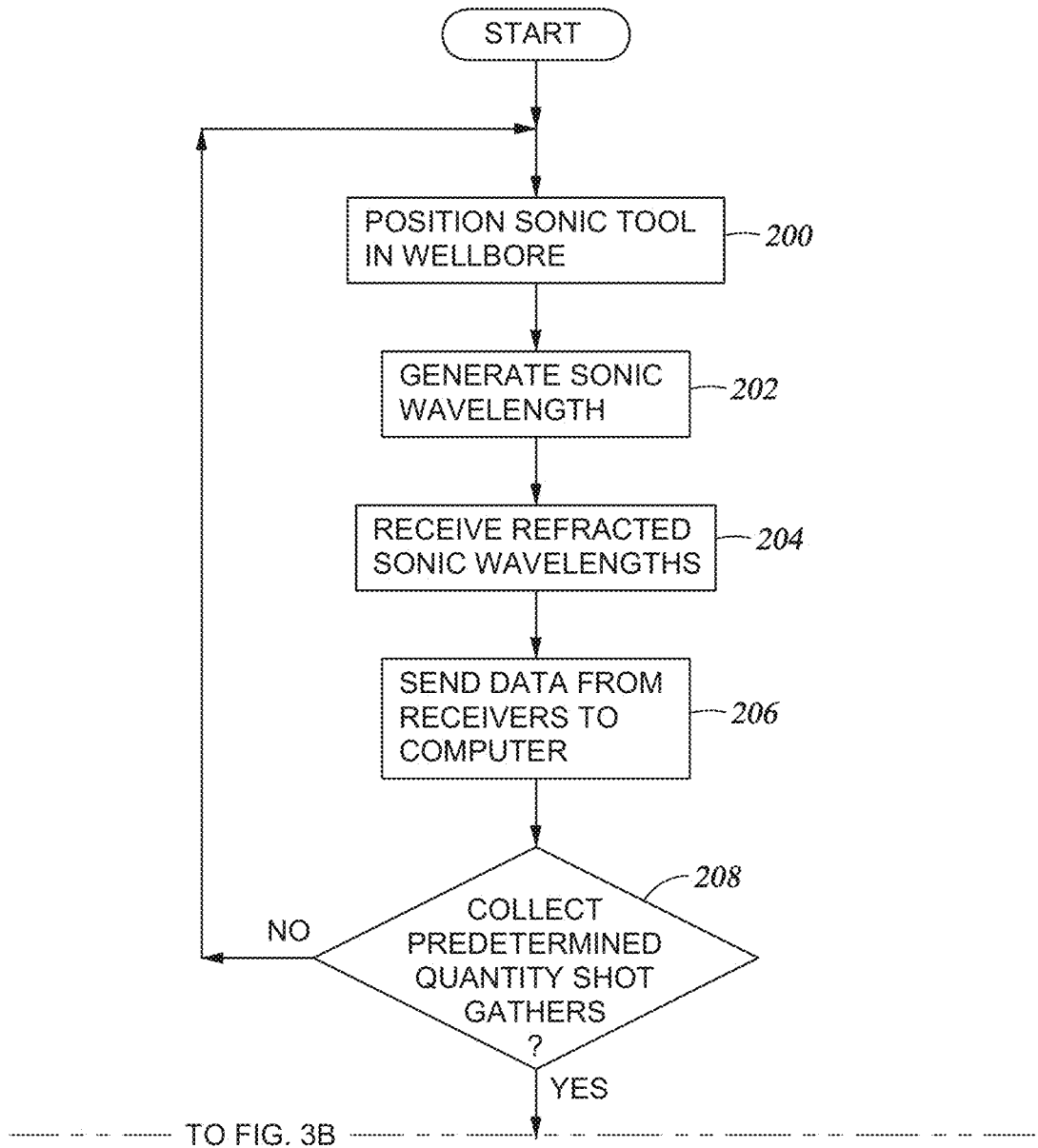
FIG. 3A-3B is a detailed schematic block flow diagram of a method of evaluating a geophysical formation according to an embodiment of the present invention.
Figure 3B:
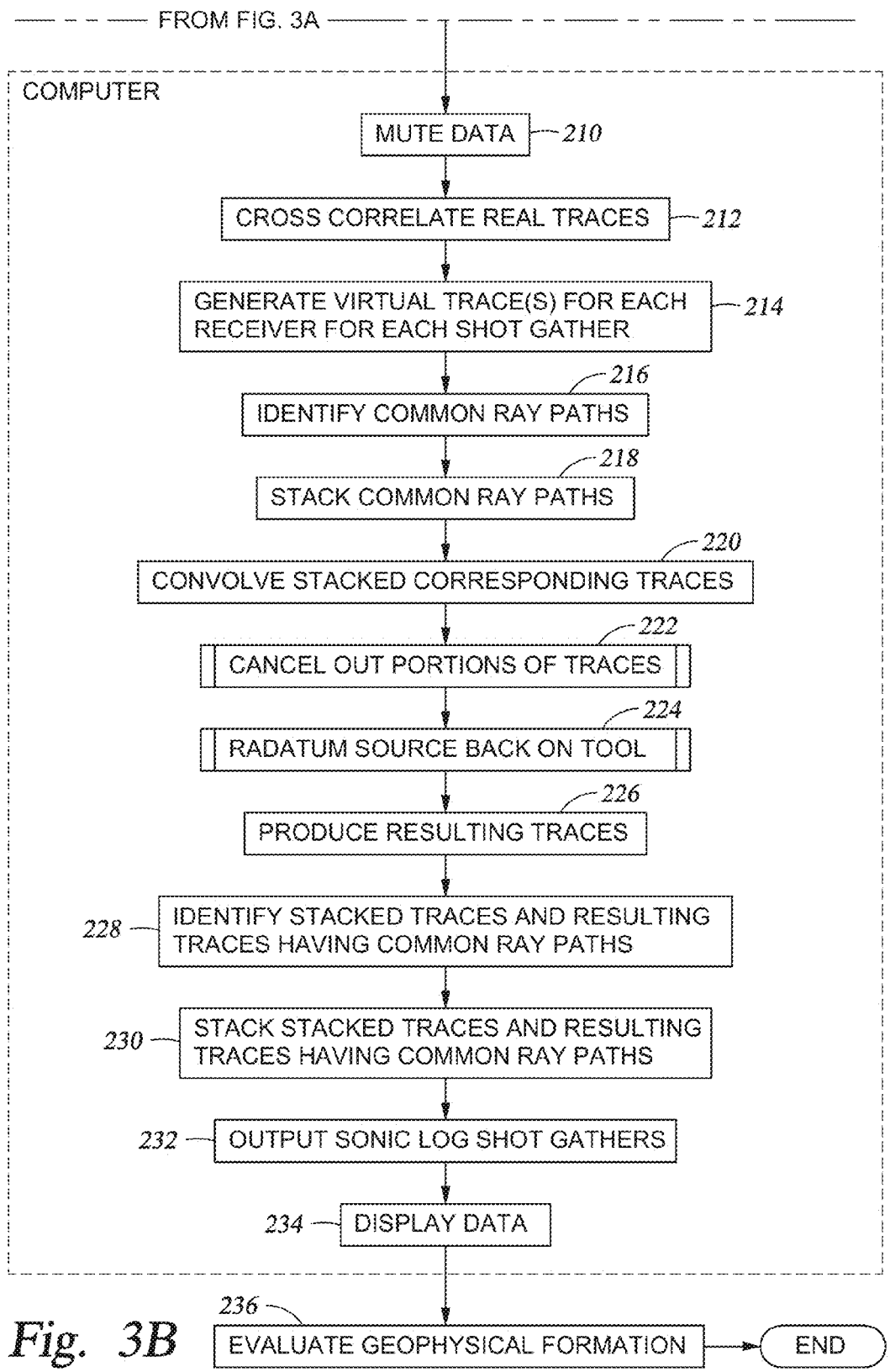

Each of the steps of an exemplary embodiment will now be described in greater detail and illustrated in FIGS. 1 to 8, including the numbered blocks of the block flow diagram of FIG. 3A-3B. The steps of this embodiment do not need to be carried out in sequential order except to the extent that a step may require the results of a preceding step.

1. Input Sortie Log Shot Gathers (block 124). To determine characteristics of a formation, the first step is to acquire sonic log waveforms over an interval. This can be done by positioning the sonic tool 100 in a wellbore (block 200). The sonic tool can include a sonic source and any number of signal receivers. For example, the sonic source could have two or three receivers, or more than three receivers. Embodiments can have, for example, 8-13 signal receivers. The sonic source can be spaced apart, from each of the signal receivers. The sonic source and the signal receivers can each be in communication with a computer, either directly or indirectly. The sonic source generates a plurality of sonic waves each having a predetermined wavelength (block 202). The predetermined wavelength can be selected based on the known properties of the geophysical formation. The wavelengths travel along a ray path, which is the path the wavelength takes as it moves through a portion of the geophysical formation and is then refracted by the geophysical formation to the signal receivers (block 204). In embodiments, the signal receivers record only refracted wavelengths and do not record direct arrival wavelengths. When the refracted wavelengths are received by each of the signal receivers, each of the signal receivers sends a data signal to the computer representing the received refracted wavelength signals (block 206). The computer can record real traces for each of the signal receivers. As one of skill in the art will appreciate, the real traces can be defined as a representation of the data from the signal receivers representing the magnitude of the refracted wavelengths over a given time interval. The process of generating the sonic waves and recording the refracted wavelength by each of the signal receivers is called a "common shot gather." In some embodiments, the sonic tool is shooting and recording every time the tool moves a distance equal to the interval spacing between the receivers. The distance from the sonic source to the first signal receiver can be any distance including, for example, about three meters or more than three meters. The distance between the signal receivers, called the "span," can be any distance including, for example, about 0.1 to 0.2 meters.

The common shot gather is repeated at least two times, although it can be repeated more than two times (block 208). The first common shot gather can be defined as the "first shot," and a subsequent common shot gather can be a second shot. The sonic source and each of the signal receivers are moved axially in the wellbore between the first shot and the second shot. In one embodiment, the signal receivers are each spaced apart by a preselected distance. The sonic tool is repositioned axially in the wellbore by a distance defined as the shooting interval. The shooting interval can be at least the preselected distance and, in one embodiment, the shooting interval equals the preselected distance. For example, the sonic tool can be repositioned upward in the wellbore by the preselected distance, equal to the distance between each signal receiver and an adjacent signal receiver, so that at the time of the second shot, the second signal receiver is in the same physical location that the first signal receiver occupied during the first shot. Similarly, the third signal receiver, after repositioning, occupies the same physical location that the second signal receiver occupied prior to repositioning. The real traces determined by the computer from the first shot for each of the signal receivers are defined as first real traces, and the real traces determined by the computer from the second shot for each of the signal receivers are defined as second real traces.

Figure 10:
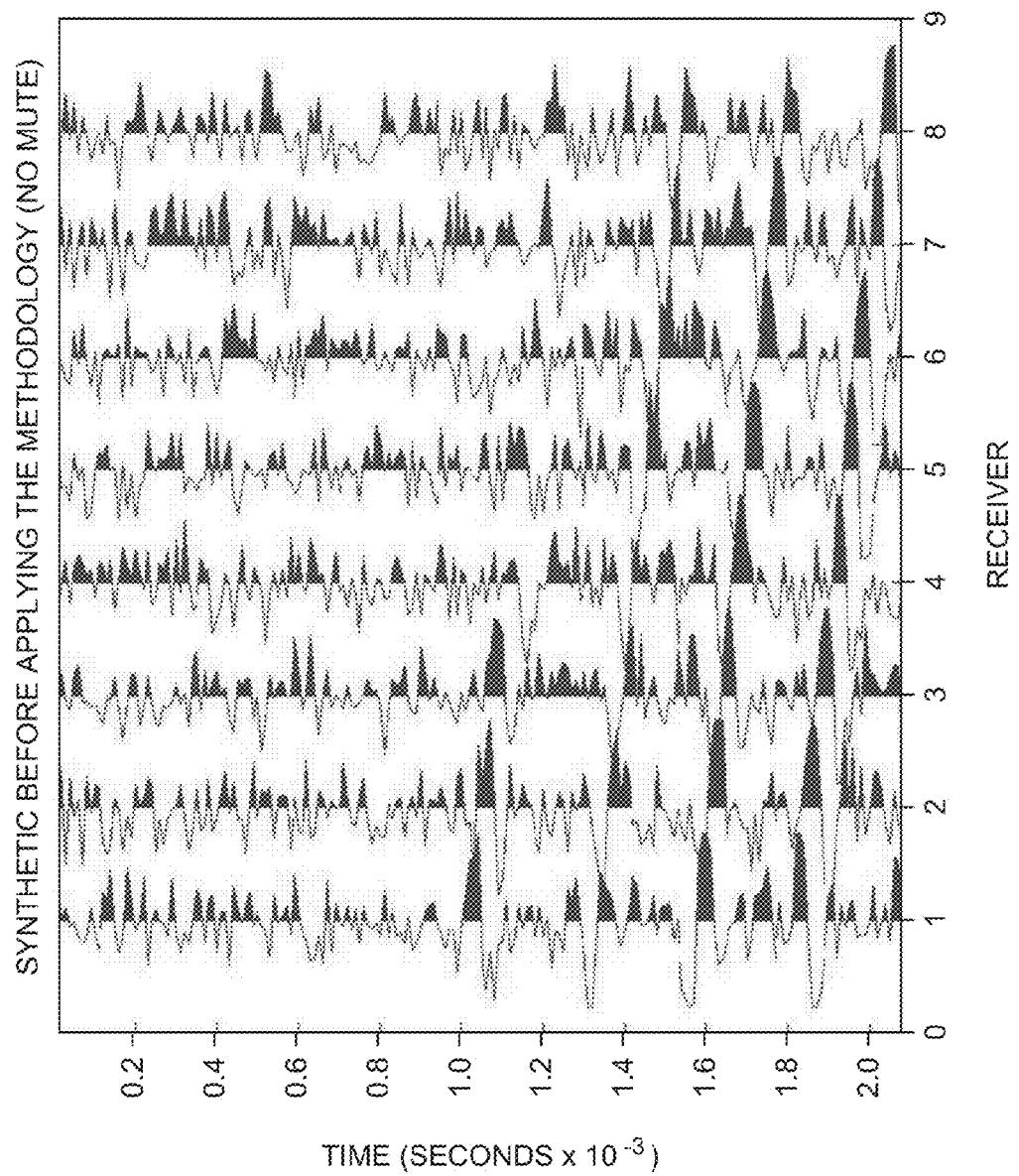
FIG. 10 is a graph showing traces representing signal data from each of eight receivers, based on synthetic data, over a period of time, with the x-axis representing the receiver number on the sonic tool and the y-axis representing the period of time.
Figure 11:
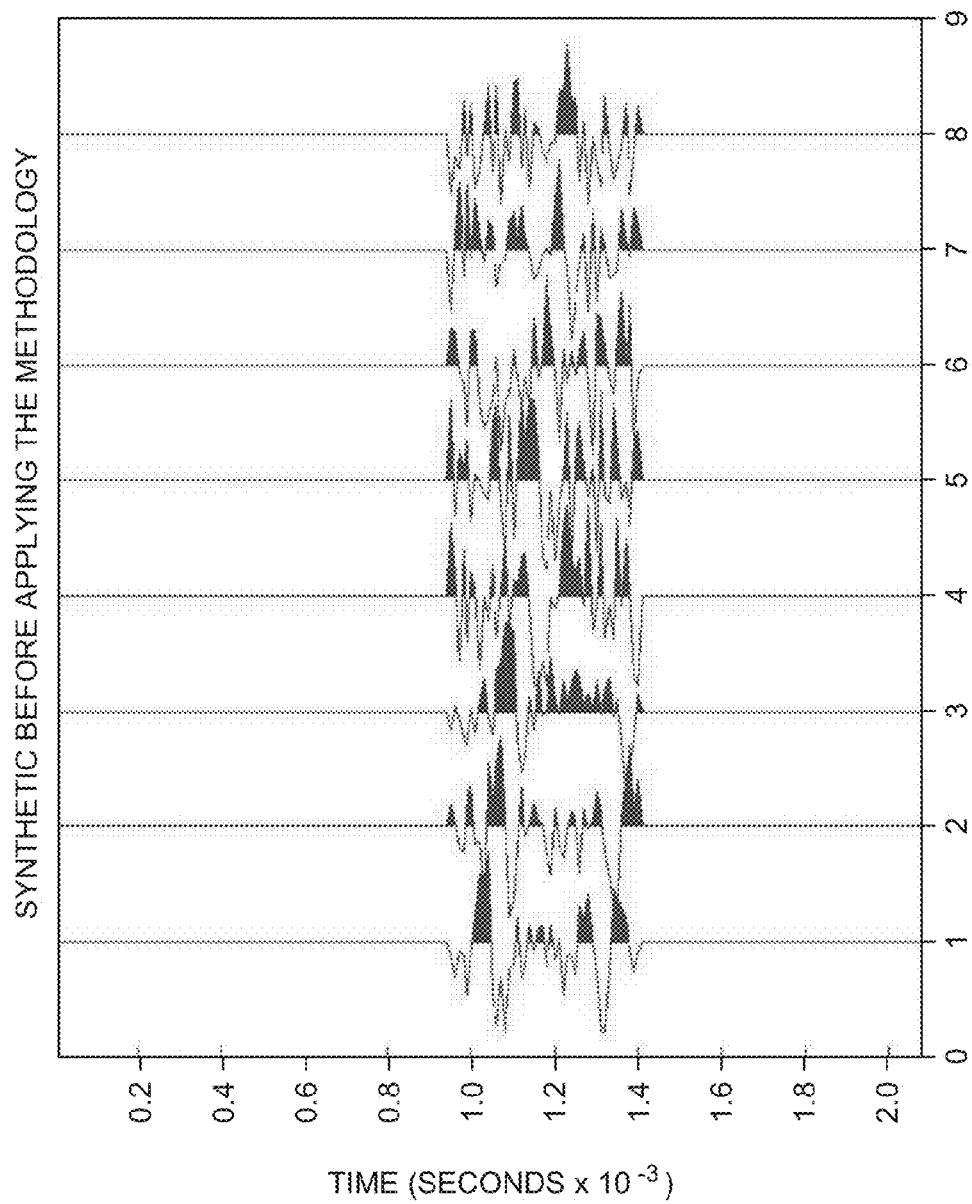
FIG. 11 is a graph showing traces representing signal data from each of eight receivers, over a period of time after muting the data of FIG. 10 to exclude data other than the first arrival, with the x-axis representing the receiver number on the sonic tool and the y-axis representing the period of time, according to an embodiment of the present invention.

After acquiring the sonic waveform data, or real traces, the data can be muted to exclude all data except in the region where the first arrival of refracted waveforms is evident (block 210). An example of muted data is shown in FIG. 11, as opposed to the original, un-muted data shown in FIG. 10.

2. Cross Correlate Corresponding Receiver Pairs (block 126). The next step includes cross-correlating, by the computer, the real traces for all the receiver pairs in the same common shot gather (block 212), for all shot gathers, to generate virtual traces (block 214). From the first-shot, the computer can determine one or more first-shot first virtual traces, each virtually originating from a first-shot first virtual wavelength source having a virtual location in the associated geophysical formation proximate to the first location of the first signal receiver by cross-correlating the one or more first real traces of the first signal receiver with the one or more first real traces of the second and third signal receivers (block 214).

The computer can also determine one or more first-shot second virtual traces, each virtually originating from a first-shot second virtual wavelength source having a virtual location in the associated geophysical formation proximate to the first location of the second signal receiver by cross-correlating the one or more first real traces of the second signal receiver with the one or more first real traces of the third signal receiver (block 214). The process can repeated for each successive signal receiver.

After repositioning the sonic tool and performing the second shot common shot gather, the computer can determine one or more second-shot first virtual traces, each virtually originating from a second-shot first virtual wavelength source having a virtual location in the associated geophysical formation proximate to the second location of the first signal receiver by cross-correlating the one or more second real traces of the first signal receiver with the one or more second real traces of the second and third signal receivers. Similarly, the computer can determine one or more second-shot second virtual traces, each virtually originating from a second-shot second virtual wavelength source having a virtual location in the geophysical formation proximate to the second location of the second signal receiver by cross-correlating the one or more second real traces of the second signal receiver with the one or more second real traces of the third signal receiver. The process can be repeated for each successive receiver.

To clarify this point, consider the example of 8 receivers in each shot gather. First, the trace recorded at receiver 1 is cross-correlated with all the other traces that are farther from the shot in the same common shot gather. Then, the trace recorded at receiver 2 is cross-correlated with all the farther traces from the source (i.e. all traces except the first). The traces from all of the shots are cross-correlated in the same manner. The computer can determine a virtual wavelength source, having a virtual location in the geophysical formation proximate to the location of one of the signal receivers.

In embodiments, each of the one or more first real traces for each of the first, second, and third signal receivers begins at a time TA, and each of the one or more virtual traces for each of the first-shot first and second virtual wavelength sources begins at one or more times TB. TB−TA=TX, TX being the time it takes one or more of the plurality of signals to travel from the sonic source to one of the first and second virtual wavelength sources.

After determining each of the virtual traces, the computer can identify one or more paths from each of the virtual wavelength sources to each of the receivers. Each such path can be defined as one of a plurality of virtual ray paths. The computer can then identify each of a plurality of common ray paths, the common ray paths being the ray paths of virtual ray paths that match at least a portion of one of the real ray paths (block 216).

The computer 110 can cross-correlate the trace of the first signal receiver $r_1$ with the traces of the other receivers $r_k$–$r_n$ for a common shot gather by applying the following formula:

$$r_k(t) \otimes r_1(t) = \int_{-\infty}^{\infty} r_k(\tau) r_1(t+\tau) d\tau$$

where k equals 2 to n, and where n is the number of the last receiver. This is equivalent to placing a source near the first receiver and in the formation. Due to the cross-correlation, that source is triggered at negative time (which is the time it takes the signal to travel from the receiver to the refractor). The application of the cross-correlation formula is graphically represented in FIG. 4. S1 represents the real sonic source (sonic source 108 of FIG. 1). R1 and R2 represent the first and second signal receivers, respectively. Ray path 136 represents the sonic waveform from the sonic source S1, refracted by formation 104, to signal receiver R2. Ray path 138 represents the sonic waveform from the sonic source S1, refracted by formation 104, to signal receiver R1. As one of skill in the art will appreciate, the symbol of the "x" within a circle represents cross-correlation. By cross-correlating the traces for receivers R1 and R2, the source is redatumed as a virtual source VS1, virtually located in the formation outside of the sonic tool 100 and near signal receiver R1.

Figure 5:
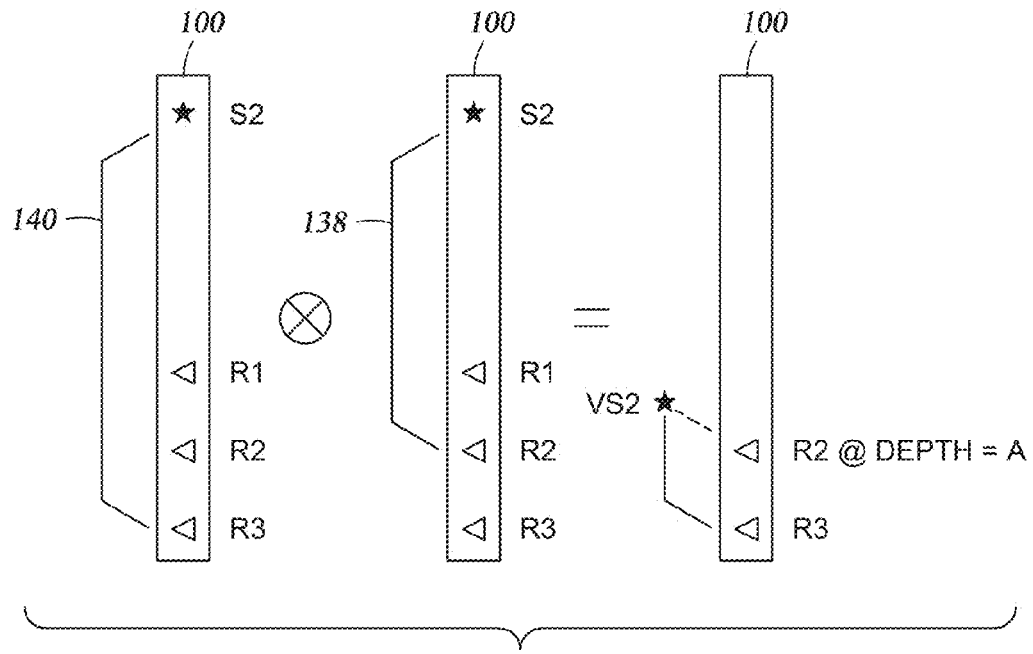
FIG. 5 is a functional diagram illustrating the determination of another redatumed virtual source by cross-correlating real traces, from the same common shot gather as shown in FIG. 4, according to an embodiment of the present invention.

The computer 110 can perform the same procedure for the second receiver R2 in relation to the subsequent receivers by cross-correlating the trace of the second receiver R2 with the traces of receivers R3, R4, . . . Rn (but not R1) to create a virtual source VS2 near the second receiver R2. The computer can perform the cross-correlation by applying following formula to the trace data from each of the appropriate signal receivers:

$$r_k(t) \otimes r_2(t) = \int_{-\infty}^{\infty} r_k(\tau) r_2(t+\tau) d\tau$$

where k equals 3 to n; t=time; and τ=a placeholder representing a negative time, the negative time being the time it takes the refracted wavelength to travel from one or more of the first, second, and third receivers to one or more of the refractors in the formation. FIG. 5 shows a graphical representation of the cross-correlation of the trace for signal receiver R2 with the traces of subsequent signal receiver R3. S2 represents the real sonic source (sonic source 106 of FIG. 1). R2 and R3 represent the second and third signal receivers, respectively. Ray path 140 represents the sonic waveform from the sonic source S2, refracted by formation 104, to signal receiver R3. Ray path 136 represents the sonic waveform from the sonic source S2, refracted by formation 104, to signal receiver R2. By cross-correlating the traces for receivers R2 and R3, the source is redatumed as a virtual source VS2, virtually located in the formation outside of the sonic tool 100 and near signal receiver R2.

The computer can similarly perform the cross-correlation for all remaining receivers (except the last because it has no other traces to cross-correlate with) for the same shot gather. The virtual source positions are in the formation rather than on the tool and are triggered at negative time (it will be equivalent to the travel time from the formation to the tool but with negative time). The ray paths for the rest of receivers will initiate from the virtual source and get refracted to the receivers.

The cross-correlation can use the formula:

$$r_{virtual} = r_k(t) \otimes r_j(t) = \int_{-\infty}^{\infty} r_j(\tau) r_k(t+\tau) d\tau$$

In this formula, $r_{virtual}$=one of the first-shot first virtual wavelength source and the first-shot second virtual wavelength source prior to the step of repositioning the sonic tool in the wellbore, or one of the second-shot first virtual wavelength source and the second-shot second virtual wavelength source after the step of repositioning the sonic tool in the wellbore. Also for this formula, $r_k$=the number of one of the first and second signal receivers; $r_j$=the number of one of another one of the second signal receiver and the third signal receiver; t=time; and τ=a placeholder representing a negative time, the negative time being the time it takes the refracted wavelength to travel from one or more of the first, second, and third receivers to one or more of the refractors in the formation.

Figure 4:
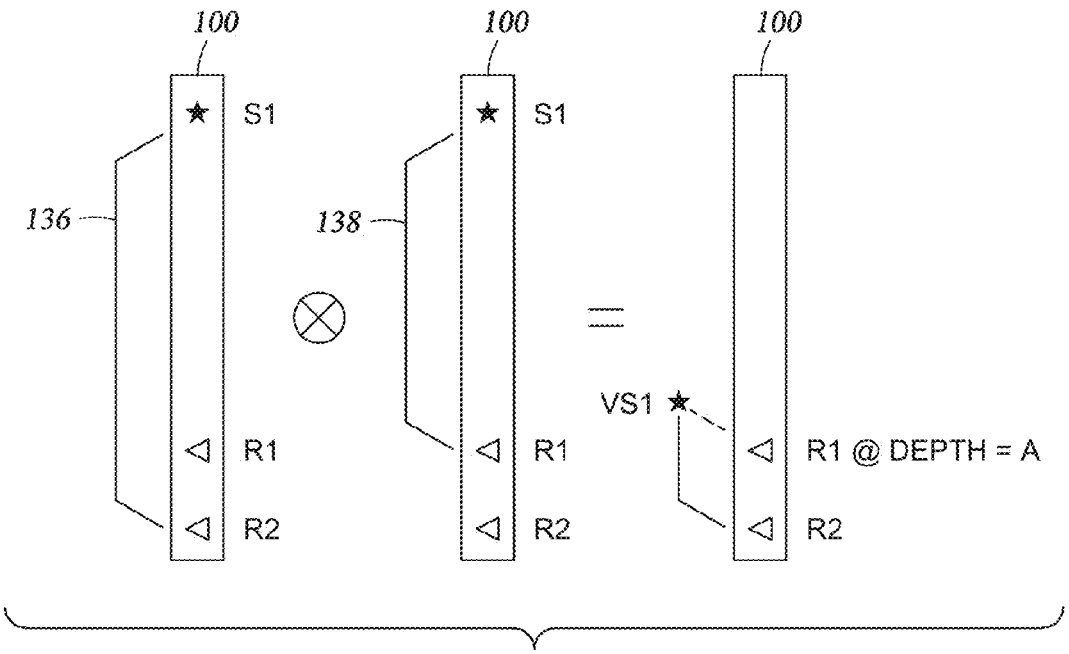
FIG. 4 is a functional diagram illustrating the determination of a redatumed virtual source by cross-correlating real traces from a common shot gather according to an embodiment of the present invention.

The sonic tool can then be moved axially through the wellbore (up or down in a vertical wellbore) a distance equal to the receiver spacing, the sonic source can generate another sonic wave form (block 202), and then the computer 110 can repeat the cross-correlation steps (block 212). By way of example, after the first shot gather, the sonic tool 100 is moved uphole a distance equal to the receiver spacing (span) and the sonic source again generates a sonic wave for a second shot gather. In this orientation, signal receiver R2 is at the same depth that signal receiver R1 occupied during the first shot gather. The traces from the signal receivers are cross-correlated in the same manner as before. The virtual source VS2, and the corresponding virtual trace, that results from the cross-correlation of signal receiver R3 and signal receiver R2 from the second shot gather (FIG. 5) is kinematically the same as the virtual source VS1 generated from the cross-correlation of signal receiver R2 with signal receiver R1 of the first shot gather. (FIG. 4). The virtual traces from VS1 of the first shot gather and from VS2 of the second shot gather have common ray paths and, thus, are considered common traces.

3. Stack (block 128). The computer can then stack the common traces, which are the traces that correspond to a common ray path (block 218). Specifically, one or more of the virtual traces and one or more of each of the first real traces and second real traces that have common ray paths can be stacked, by the computer, to cancel out random noise during a summation of a signal portion of the real and virtual traces, thereby defining a stacked trace.

By summing the traces that have common ray paths, the signal-to-noise ratio of the resulting stacked trace is increased. The ratio is increased when the random noise cancels out while the signal is summed.

4. Convolve (block 130). The computer can determine one or more resulting traces, each of the one or more resulting traces being configured to initiate at a location of the sonic source and end at one of the first and second locations of one of the first, second, and third signal receivers. To determine the resulting traces, the computer can convolve one or more of the virtual traces with one or more of the first real traces and second real traces (block 220). The one or more first real traces and second real traces can each have a ray path terminating at a location where one of the virtual traces starts, so that a portion of at least one of the virtual traces cancels out with a portion of at least one of the first and second real traces (block 222).

Figure 6:
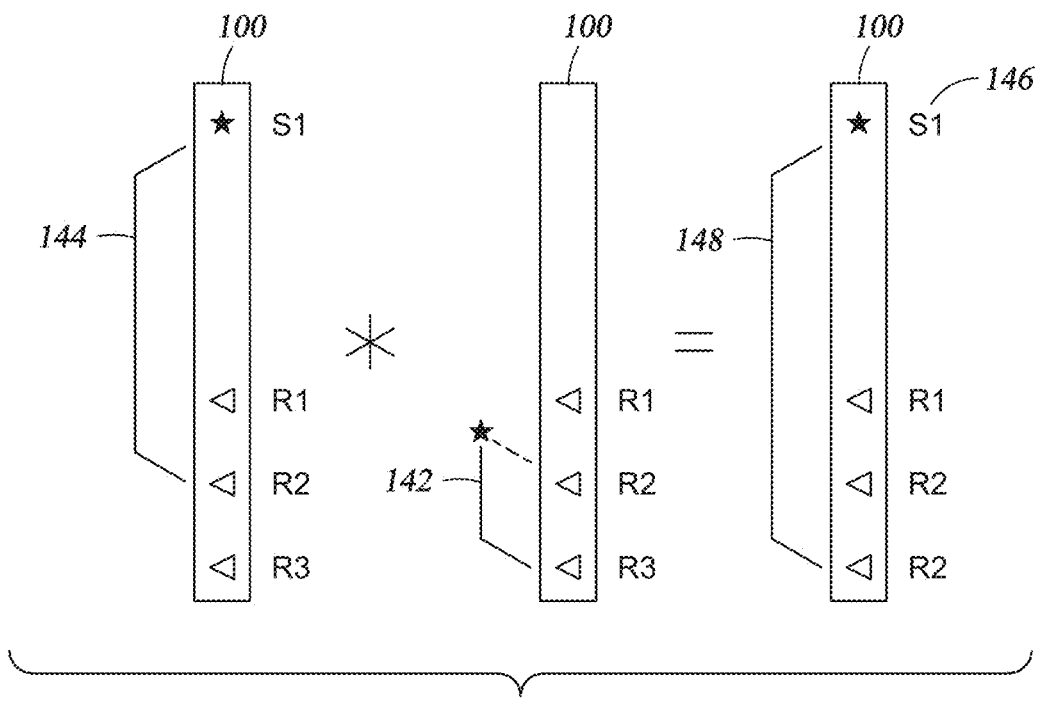
FIG. 6 is a functional diagram illustrating the determination of a resulting trace by convolving a trace corresponding to a real ray path with a trace corresponding to a virtual ray path, according to an embodiment of the present invention.

The computer can perform this step by convolving each of the virtual traces with a corresponding real trace that has a ray path terminating where the negative time of the virtual trace is starting. The negative component of virtual trace will cancel out with the positive component from the real trace (FIG. 6; block 222). The resulting trace will initiate at the location of the real source and end at the receiver of the virtual source. The following formula can be used to convolve the virtual and real traces:

$$r_k(t) * r_{virtual}(t) = \int_{-\infty}^{\infty} r_k(\tau) r_{virtual}(t-\tau) d^2\tau$$

In this formula, $r_k$=the number of one of the first and second signal receivers, and $r_{virtual}$=the number of one of the first-shot first virtual wavelength source and the first-shot second virtual wavelength source prior to repositioning the sonic tool in the wellbore and one of the second-shot first virtual wavelength source and the second-shot second virtual wavelength source after repositioning the sonic tool in the wellbore; t=time; and τ=a placeholder representing a negative time, the negative time being the time it takes the refracted wavelength to travel from one or more of the first, second, and third receivers to one or more of the refractors in the formation.

The original shot and receiver configuration is now obtained (both the shot and the receiver locations are on the tool). As shown in FIG. 6, convolving the virtual trace corresponding to ray path 142 with an actual trace corresponding to ray path 144 terminating where the virtual trace 142 is initiating will redatum the source 146 back on the tool (block 224). One of skill in the art will recognize that the "*" symbol represents application of a convolution equation. The trace produced from this redatumed source is a resulting trace corresponding to ray path 148 (block 226).

Figure 7:
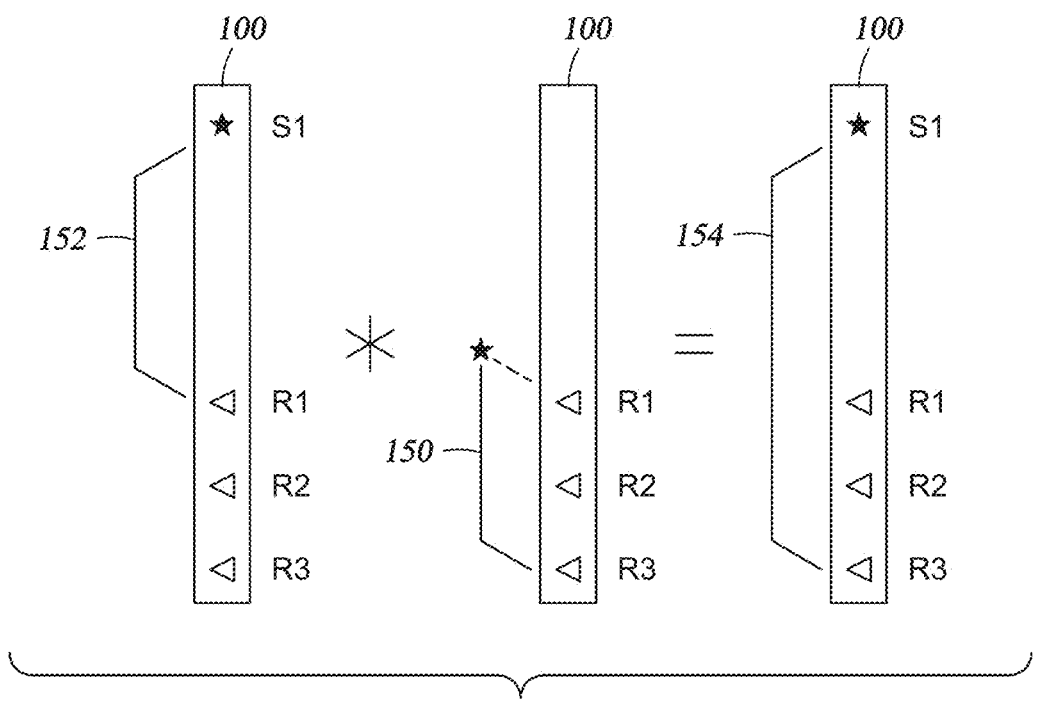
FIG. 7 is a functional diagram illustrating the determination of another resulting trace, corresponding to the same ray path as the resulting trace of FIG. 6, by convolving a trace corresponding to another real ray path with a trace corresponding to another virtual ray path, according to an embodiment of the present invention.

Stack (block 132). The computer can identify stacked traces and resulting traces having common ray paths (block 228). In FIG. 7, for example, a resulting trace is created by convolving the virtual trace corresponding to ray path 150 with the real trace corresponding to ray path 152. The resulting trace corresponds to ray path 154. Even though ray path 148 (FIG. 6) and ray path 154 were determined from different ray paths, they have the same ray resulting paths and, thus, the resulting ray paths can be stacked to sum the signal (block 228).

5. The computer can then stack each of the resulting traces that have common ray paths to define one or more representative traces (block 230). The representative traces can have a representative-trace signal-to-noise ratio greater than a signal-to-noise ratio of one or more of the first and second real traces and, thus, can be used to define a velocity of at least a portion of the geophysical formation. By summing the traces corresponding to common ray paths (the ray paths having the same source and receiver positions), the signal-to-noise ratio can be increased due to the two stacking operations. This can increase the accuracy and reliability when evaluating formation velocities.

Figure 8:
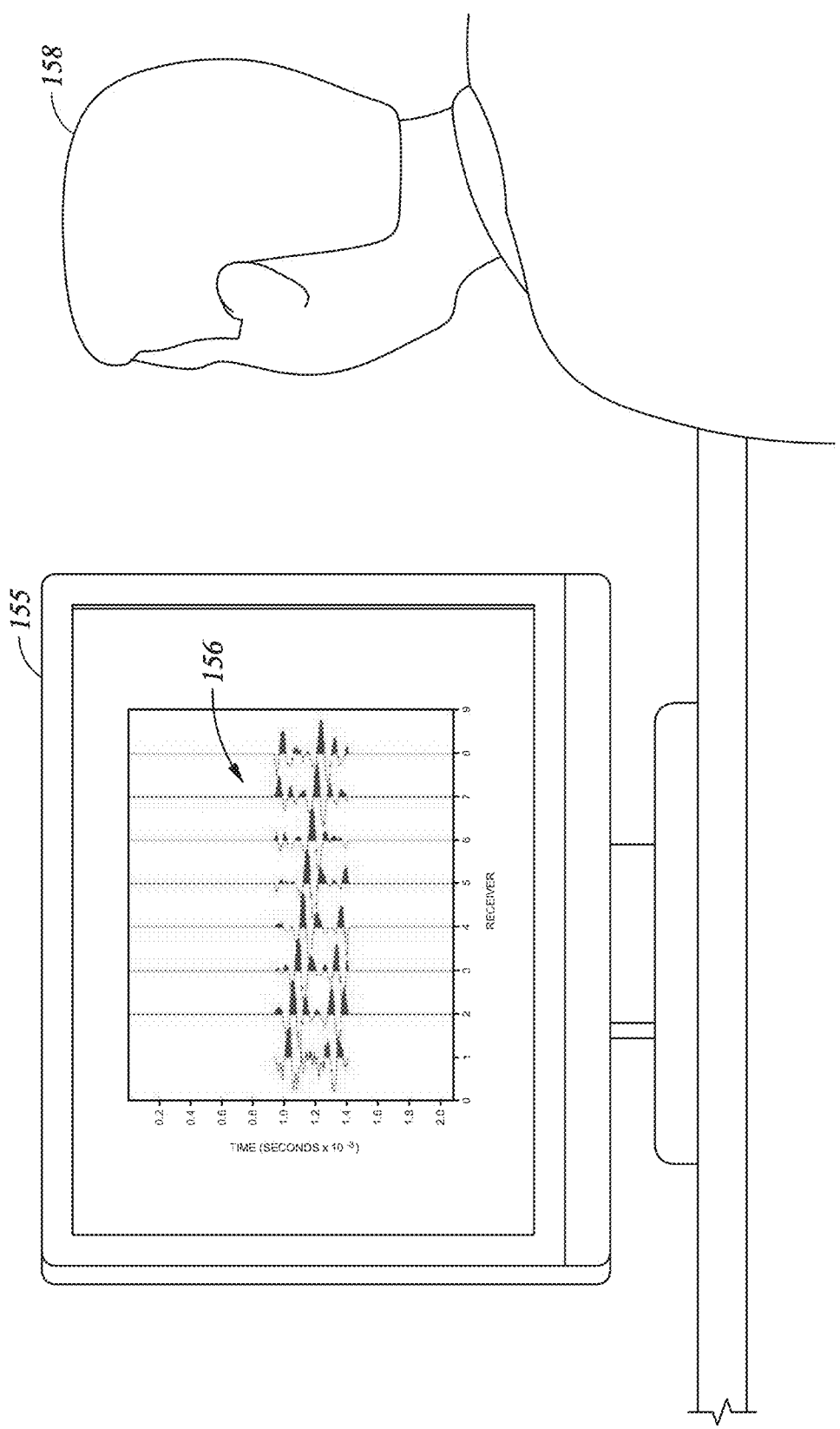
FIG. 8 is an environmental view showing a display of data representing geophysical formation characteristics and an operator viewing the display, according to an embodiment of the present invention.

6. Output Sonic Log Shot Gathers (block 134). The one or more representative traces can be output from the computer, for example, as data, as a graphical representation, or as a visual display (block 232). For example, the representative traces can be displayed on a display 120 (FIG. 1) to indicate one or more densities of the geophysical formation to indicate whether fluids, such as hydrocarbons, are present in the geophysical formation (block 234). The display can be connected to the computer 110 or the data can be transferred to a display that is located apart from the computer 110. The refracted sound waves that were received and recorded in block 204 are, thus, transformed by the computer into visual images and graphical representations, presented on a visual display, representing properties of the geophysical formation. The representative traces illustrate the arrival times of sonic waves based on signals received, with less noise than was present in the actual signals received. FIG. 8 shows an exemplary embodiment of a graphical user interface and display 155 presenting data 156 to indicate one or more characteristics of a geophysical formation to a user 158. In this embodiment, the data includes a representative trace which, as one of skill in the art will appreciate, can indicate characteristics of the geophysical formation. The representative trace has a higher signal to noise ratio than the real traces created from signals received by the signal receivers in the common shot gathers. The geophysical formation data can also be presented as a printout or as data for further analysis. The geophysical formation data, such as representative traces, can be analyzed to determine one or more velocities of the formation and, ultimately, indicate various characteristics of the formation such as porosity, density, the presence of hydrocarbons, pressure, and seismic to well calibration (block 236). The user 158 can use this data to gain knowledge and make decisions regarding the geophysical formation. The decisions can include decisions regarding, for example, perforation of casing, fracturing the geophysical formation, continued drilling operations, drilling mud, and other decisions regarding wellbore drilling and production.

The displayed representative traces can have an increased signal-to-noise ratio (due to the two stacking operations involved) of the sonic waveforms recorded which will result in more accurate velocity estimations for reservoir evaluation. The representative traces can be produced by stacking the waveforms twice while still using conventional sonic log acquisition equipment. The output representative traces can be used to evaluate the geophysical formation and make production decisions such as, for example, whether to perforate a particular portion of the wellbore (block 234). The computer 110 can perform at least a portion of the evaluation, or the evaluation can be performed by a person such as, for example, a geophysicist, a geologist, or petroleum engineer, using the output from the computer.

Experimental Data

Figure 9:
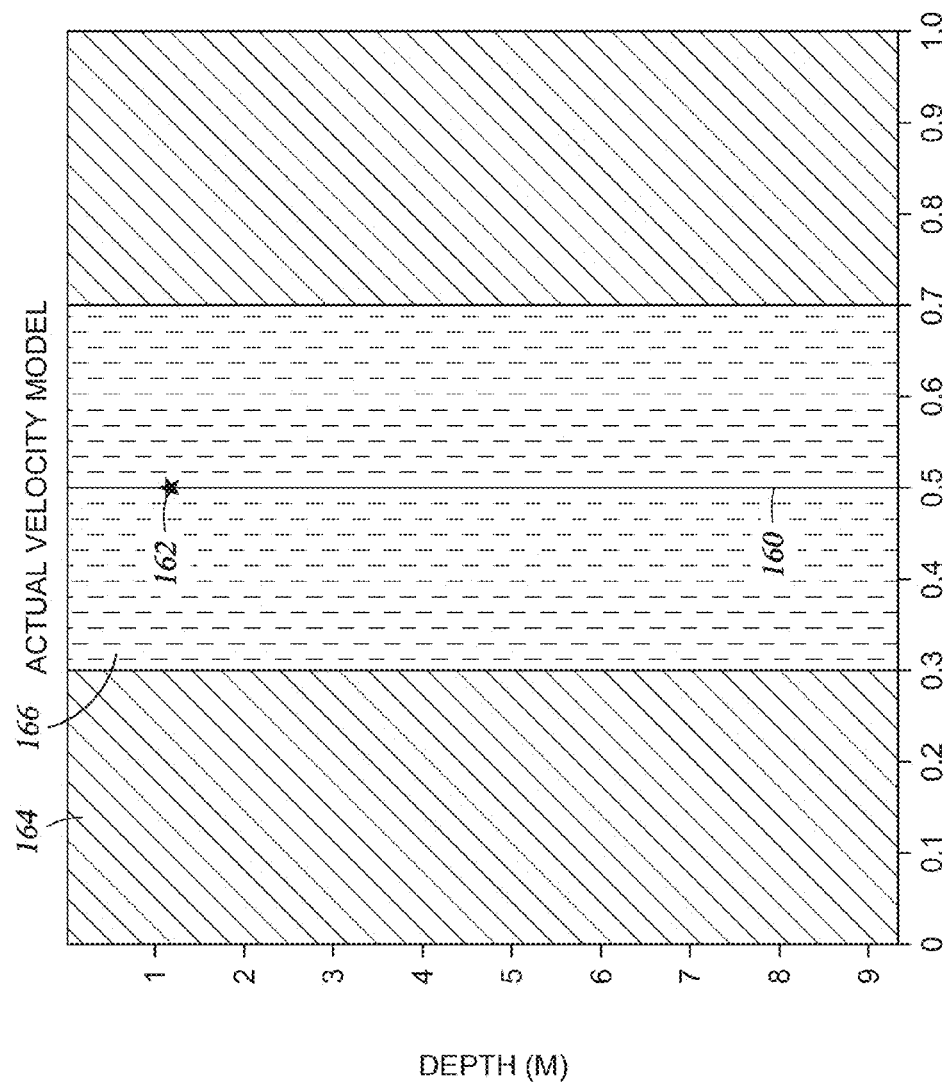
FIG. 9 is a graph showing a velocity model used for a synthetic model experiment, having a y-axis showing depth and an x-axis showing a horizontal distance, according to an embodiment of the present invention.

One experiment included generating synthetic sonic data using a second order acoustic finite difference code. The peak frequency used was 10,000 Hz and the source was placed in the middle of the well and fired every 0.5 ft. (0.1524 m). The distance from the source to the first receiver was 10.24 ft. (3.1212 m). The distance between receivers was 0.5 ft. (0.1524 m), and the sonic tool had 8 receivers. The sampling interval dt=10*10−6 second while dx=0.005 m. FIG. 9 shows the velocity model used for the synthetic model. The line 160 indicates the receiver position and the star 162 indicates the source position for one of the shots. The shaded portion identified by numeral 164 represents a velocity generally between 4500 and 5000 meters per second, and the shaded portion identified by numeral 166 represents a velocity generally between 1500 and 2000 meters per second.

Figure 12:
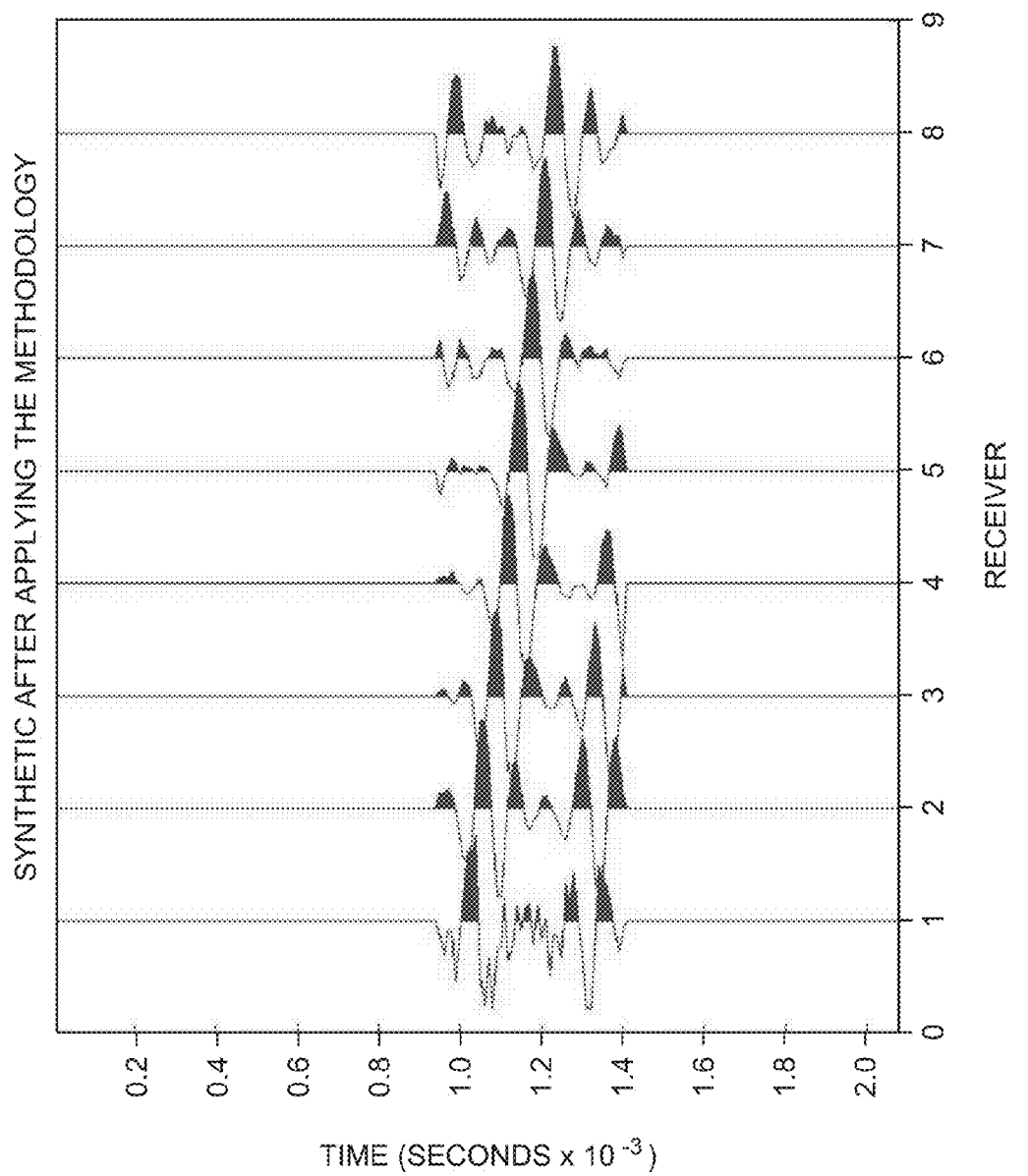
FIG. 12 is a graph showing traces representing modified signal data from each of eight receivers, over a period of time, after applying super-virtual borehole sonic interferometry to the data of FIG. 11 with the x-axis representing the receiver number on the sonic tool and the y-axis representing the period of time, according to an embodiment of the present invention.

To simulate the actual borehole environment random noise was added to the data. FIG. 10 shows the synthetic sonic data after adding noise. Because the first arrival data can be the most significant for characterization of the formation, the data outside of the first arrival data was muted in order to minimize the effect of other arrivals. FIG. 11 shows a sample of the data after muting. An embodiment of the super-virtual borehole sonic interferometry technique (cross-correlate and stack, convolve and stack) was applied, which included first muting the less relevant data, and the result was a section that had a much higher signal-to-noise ratio. FIG. 12 is an example of data traces for eight signal receivers after applying super-virtual borehole sonic interferometry.

Figure 13:
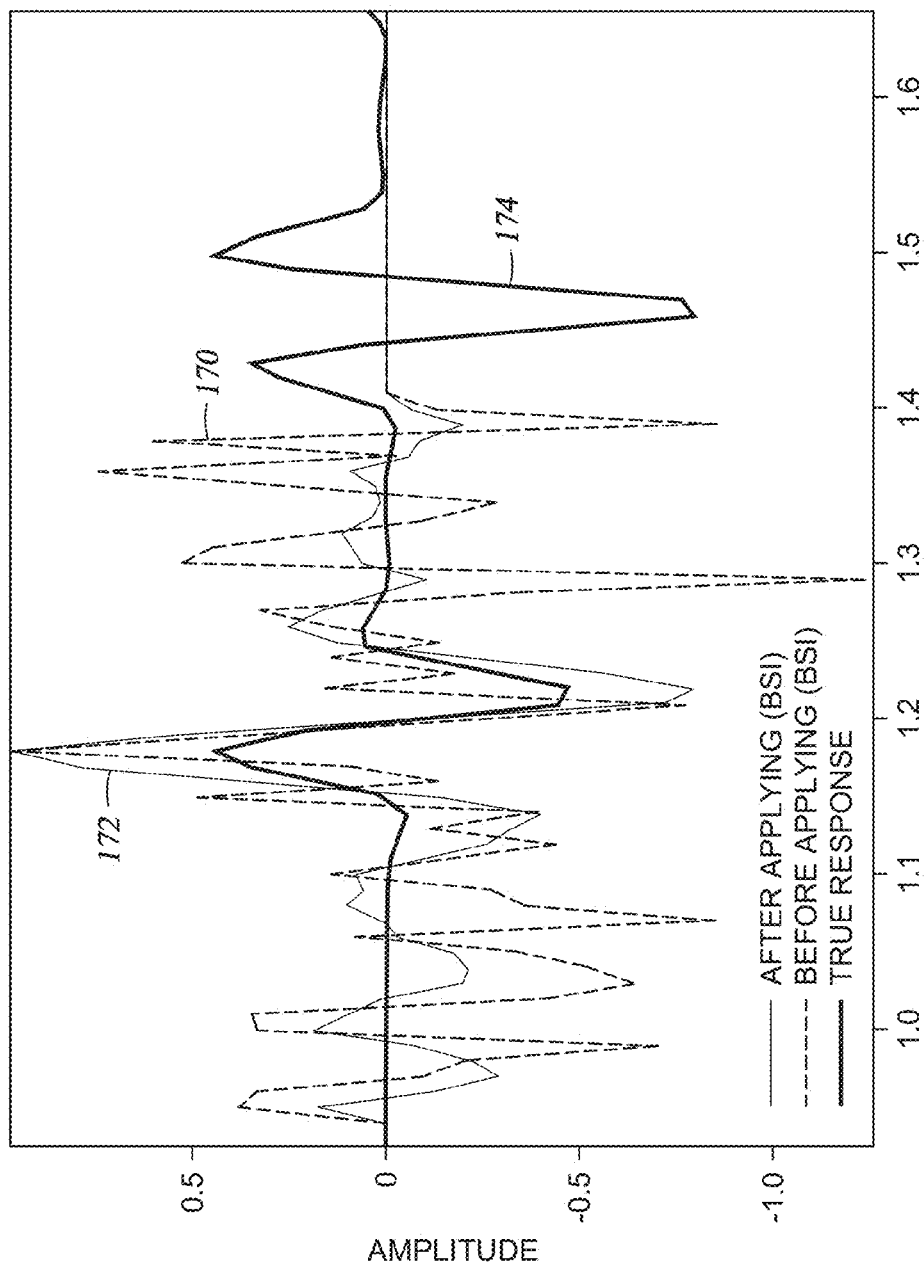
FIG. 13 is a graph comparing a "True Response" from data representing a geophysical formation, a trace before applying super-virtual borehole sonic interferometry, and a trace after applying super-virtual borehole sonic interferometry, for a single receiver, with the x-axis representing time and the y-axis representing the amplitude of the trace, according to an embodiment of the present invention.

FIG. 13 shows the effect of an embodiment of super-virtual borehole sonic interferometry on the trace of a single signal receiver (Receiver #6). Trace 170 is the trace before applying an embodiment of super-virtual borehole sonic interferometry and trace 172 is the trace after applying an embodiment of super-virtual borehole sonic interferometry. Traces 170 and 172 can be compared to trace 174, which shows the true response of the signal from the original test data.

Figure 14:
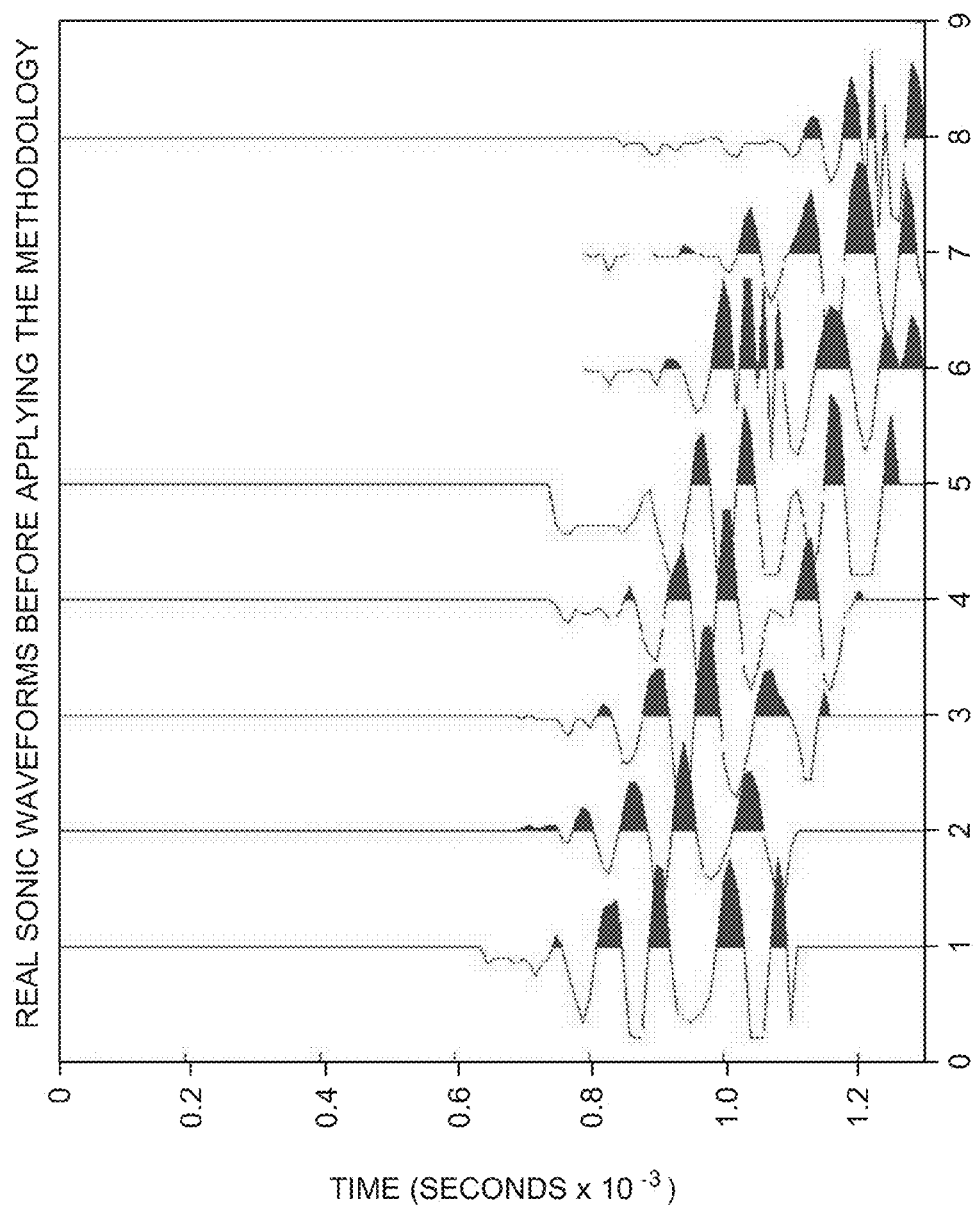
FIG. 14 is a graph showing traces representing real sonic data acquired using a sonic tool over a period of time for each of eight receivers, with the x-axis representing the receiver number on the sonic tool and the y-axis representing the period of time.
Figure 15:
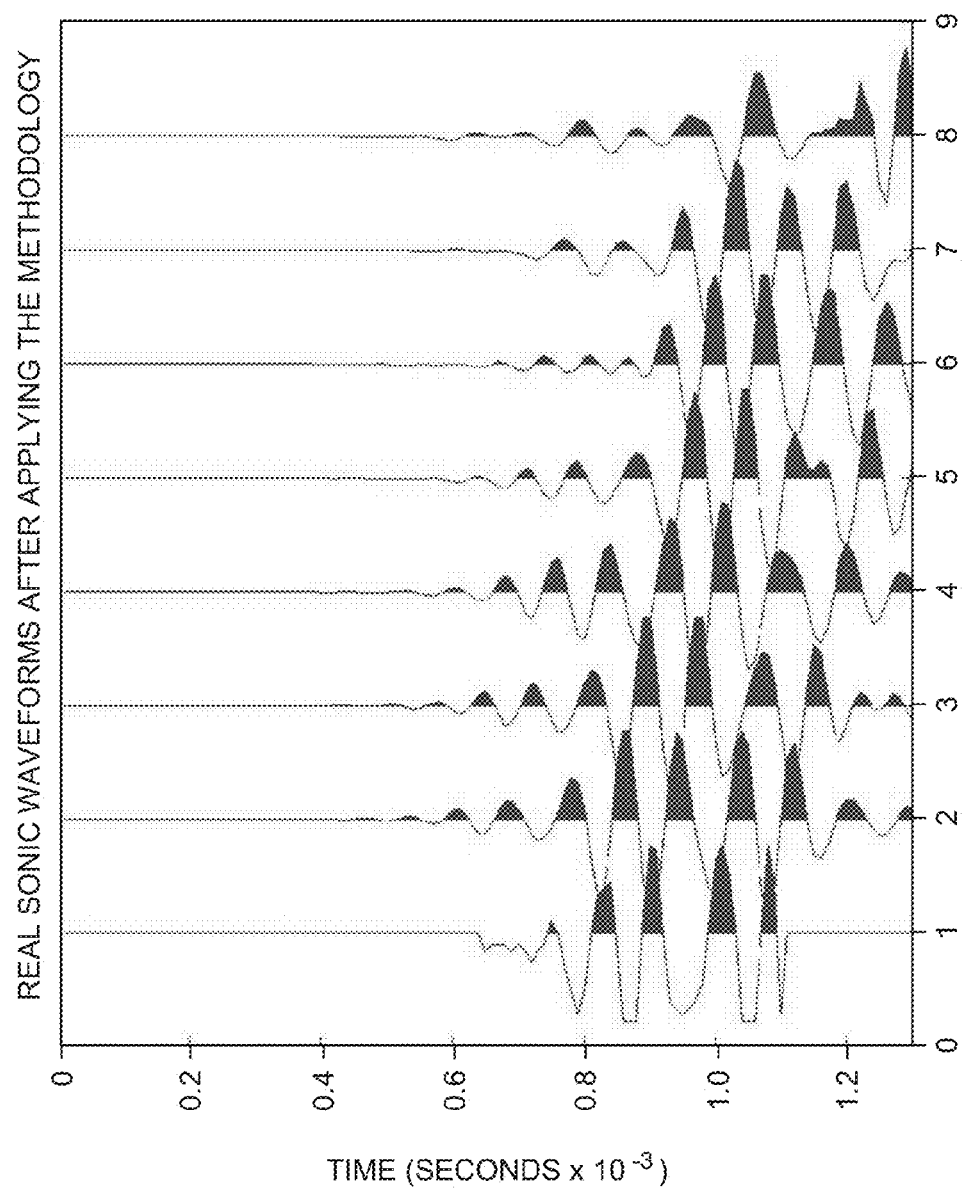
FIG. 15 is a graph showing traces representing modified signal data from each of eight receivers, over a period of time, after applying super-virtual borehole sonic interferometry to the data of FIG. 14, with the x-axis representing the receiver number and the y-axis representing the period of time, according to an embodiment of the present invention.

After obtaining the results for the synthetic case, real data was used to test an embodiment of super-virtual borehole sonic interferometry. The data logged was collected in the North Pacific. The source was a monopole source with frequency range of 5-30 Khz. The sampling interval was 10 microseconds. That shot interval 6 inches and the receiver spacing (span) was also 6 inches. A total of 7 shots were acquired each with 8 receivers. The sonic tool used was a Schlumberger tool named Dipole Shear Sonic Imager (DSI). The data was obtained from the website: http://brg.ldeo.columbia.edu/logdb/. Notice that before applying an embodiment of the method, the far traces (receivers 6-8) show distorted and weak first arrivals (FIG. 14). After applying an embodiment of the methodology the arrivals are amplified and the noise affecting the signal is attenuated (FIG. 15).

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A computer-implemented method of evaluating geophysical formations, the computer-implemented method comprising:

positioning one or more sonic tools in a first position in a wellbore such that each of a sonic source, a first signal receiver, a second signal receiver, and a third signal receiver of the one more sonic tools is located in a respective first location in the wellbore, the sonic source being axially spaced apart from each of the first, second, and third signal receivers, the first, second, and third signal receivers being equally spaced apart from each other by a preselected distance such that the first signal receiver is the preselected distance from the second signal receiver and the second signal receiver is the preselected distance from the third signal receiver, the preselected distance being between 0.1 meters to 0.2 meters, a distance from the sonic source to the first signal receiver being at least 3 meters, and the sonic source and the first, second, and third signal receivers being in communication with one or more computers;

generating, from the sonic source of the one or more sonic tools in the first position in the wellbore, a plurality of sonic waves each having a predetermined wavelength;

determining, by the one or more computers, one or more first real traces for each of the first, second, and third signal receivers, the one or more first real traces being data representing a first plurality of refracted wavelengths received, from the sonic source, by each of the first, second, and third signal receivers located at the respective first location of each of the first, second, and third signal receivers, each of the plurality of refracted wavelengths travelling along one of a plurality of first real ray paths from the sonic source, through an associated geophysical formation to one or more refractors within the associated geophysical formation, and then to one of the first, second, and third signal receivers;

determining, by the one or more computers, one or more first-shot first virtual traces, each virtually originating from a first-shot first virtual wavelength source having a virtual location in the associated geophysical formation proximate to the first location of the first signal receiver by cross-correlating the one or more first real traces of the first signal receiver with the one or more first real traces of the second and third signal receivers;

determining, by the one or more computers, one or more first-shot second virtual traces, each virtually originating from a first-shot second virtual wavelength source having a virtual location in the associated geophysical formation proximate to the first location of the second signal receiver by cross-correlating the one or more first real traces of the second signal receiver with the one or more first real traces of the third signal receiver;

determining a shooting interval distance that is equal to or greater than the preselected distance;

repositioning the sonic tool axially in the wellbore by the shooting interval distance, the repositioning comprising moving the sonic tool to a second position in the wellbore that is located the shooting interval distance from the first position in the wellbore such that the first signal receiver is located in a respective second position located the shooting interval distance from the first position of the first signal receiver, the second signal receiver is located in a respective second position located the shooting interval distance from the first position of the second signal receiver, and the third signal receiver is located in a respective second position located the shooting interval distance from the first position of the third signal receiver;

generating . . . a second plurality of sonic waves each having a predetermined wavelength;

determining, by the one or more computers, a second real trace for each of the first, second, and third signal receivers, the second real traces being data representing a second plurality of refracted wavelengths received, from the sonic source, by each of the first, second, and third signal receivers located at the respective second location of each of the first, second, and third signal receivers, each of the second plurality of refracted wavelengths travelling along one of a plurality of second real ray paths from the sonic source, through the associated geophysical formation to one or more of the refractors within the associated geophysical formation, and then to one of the first, second, and third signal receivers;

the one or more computers further performing the steps of:

determining one or more second-shot first virtual traces, each virtually originating from a second-shot first virtual wavelength source having a virtual location in the associated geophysical formation proximate to the second location of the first signal receiver by cross-correlating the one or more second real traces of the first signal receiver with the one or more second real traces of the second and third signal receivers;

determining one or more second-shot second virtual traces, each virtually originating from a second-shot second virtual wavelength source having a virtual location in the geophysical formation proximate to the second location of the second signal receiver by cross-correlating the one or more second real traces of the second signal receiver with the one or more second real traces of the third signal receiver;

identifying one or more paths from each of the virtual wavelength sources to each of the first, second, and third receivers to define a plurality of virtual ray paths;

identifying each of the plurality of virtual ray paths that match a portion of at least one of the first real ray paths and second real ray paths, to define a plurality of common ray paths;

stacking one or more of the virtual traces and one or more of each of the first real traces and second real traces that have common ray paths to cancel out random noise during a summation of a signal portion of the one or more of the first real traces, second real traces, and virtual traces to define one or more stacked traces;

determining one or more resulting traces, each of the one or more resulting traces being configured to initiate at a location of the sonic source and end at one of the first and second locations of one of the first, second, and third signal receivers, the determining of the one or more resulting traces including convolving one or more of the virtual traces with one or more of the first real traces and second real traces, the one or more first real traces and second real traces each having a ray path terminating at a location where the virtual trace starts, to cause a portion of at least one of the virtual traces to cancel out with a portion of at least one of the first and second real traces;

stacking each of the stacked traces and resulting traces having common ray paths to define one or more representative traces, the representative traces having a representative-trace signal-to-noise ratio greater than a signal-to-noise ratio of one or more of the first and second real traces and defining a velocity of at least a portion of the geophysical formation; and displaying the one or more representative traces on a display in communication with the one or more computers to indicate one or more densities of the geophysical formation to indicate whether hydrocarbons are present in the geophysical formation.

2. The computer-implemented method as defined by claim 1, further comprising the step of determining whether to perforate the wellbore in response to the indication of whether hydrocarbons are present in the geophysical formation.

3. The computer-implemented method as defined by claim 1, wherein the first shot first virtual wavelength source is kinematically equivalent to the second shot second virtual wavelength source and wherein each of the one or more computers comprises one or more processors and non-transitory computer memory having one or more computer programs being executable on the one or more processors, and an input/output.

4. The computer-implemented method as defined by claim 1, wherein each of the one or more first real traces for each of the first, second, and third signal receivers begins at a time $T_A$, and each of the one or more virtual traces for each of the first-shot first and second virtual wavelength sources begins at one or more times $T_B$, and wherein $T_B - T_A = T_X$, $T_X$ being the time it takes one or more of the plurality of signals to travel from the sonic source to one of the first and second virtual wavelength sources.

5. The computer-implemented method as defined by claim 1, wherein cross-correlation comprises using the formula:

$$r_{virtual} = r_k(t) \otimes r_j(t) = \int_{-\infty}^{\infty} r_j(\tau) r_k(t+\tau) d\tau$$

wherein $r_{virtual}$=one of the first-shot first virtual wavelength source and the first-shot second virtual wavelength source prior to the step of repositioning the sonic tool in the wellbore, and one of the second-shot first virtual wavelength source and the second-shot second virtual wavelength source after the step of repositioning the sonic tool in the wellbore; and $r_k$=the number of one of the first and second signal receivers; $r_j$=the number of one of another one of the second signal receiver and the third signal receiver; t=time; and τ=a placeholder representing a negative time, the negative time being the time it takes the refracted wavelength to travel from one or more of the first, second, and third receivers to one or more of the refractors in the formation.

6. The computer-implemented method as defined by claim 1, wherein a distance from the signal source to first signal receiver is at least 3 meters and the preselected distance is between 0.1 and 0.2 meters.

7. The computer-implemented method as defined by claim 1, wherein convolving each of the stacked traces comprises calculating the resulting trace from the formula:

$$r_k(t) * r_{virtual}(t) = \int_{-\infty}^{\infty} r_k(\tau) r_{virtual}(t-\tau) d^2\tau$$

wherein $r_k$=the number of one of the first and second signal receivers; $r_{virtual}$=the number of one of the first-shot first virtual wavelength source and the first-shot second virtual wavelength source prior to repositioning the sonic tool in the wellbore and one of the second-shot first virtual wavelength source and the second-shot second virtual wavelength source after repositioning the sonic tool in the wellbore; t=time; and τ=a placeholder representing a negative time, the negative time being the time it takes the refracted wavelength to travel from one or more of the first, second, and third receivers to one or more of the refractors in the formation.

8. A system to evaluate geophysical formations, the system comprising:

one or more sonic tools each including a sonic source, a first signal receiver, a second signal receiver, and a third signal receiver, the sonic source being axially spaced apart from each of the first, second, and third signal receivers, the first, second, and third signal receivers being equally spaced apart from each other by a preselected distance such that the first signal receiver is the preselected distance from the second signal receiver and the second signal receiver is the preselected distance from the third signal receiver, the preselected distance being between 0.1 meters and 0.2 meters, a distance from the sonic source to the first signal receiver being at least 3 meters, and the sonic source and the first, second, and third signal receivers being in communication with a computer, the sonic source adapted to generate a plurality of sonic waves each having a predetermined wavelength;

determining a shooting interval distance that is equal to or greater than the preselected distance;

a positioner connected to the sonic tool, the positioner
configured to perform the following steps:
positioning the sonic tool in a wellbore such that each
of the sonic source, the first signal receiver, the
second signal receiver, and the third signal receiver
of the one more sonic tools is located in a respective
first location in the wellbore; and
repositioning the sonic tool axially in the wellbore by
the shooting interval distance, the repositioning comprising moving the sonic tool to a second position in
the wellbore that is located the shooting interval
distance from the first position in the wellbore such
that the first signal receiver is located in a respective
second position located the shooting interval distance from the first position of the first signal
receiver, the second signal receiver is located in a
respective second position located the shooting interval distance from the first position of the second
signal receiver, and the third signal receiver is
located in a respective second position located the
shooting interval distance from the first position of
the third signal receiver;
a machine in communication with the first, second, and
third signal receivers, the machine including one or
more processors, a display in communication with the
one or more processors and non-transitory, computer-readable memory having one or more executable programs stored therein and being operable with the one or
more processors, wherein the one or more programs
instructs the one or more processors to perform the
following steps:
determining one or more first real traces for each of the
first, second, and third signal receivers, the one or
more first real traces being data representing a first
plurality of refracted wavelengths received, from the
sonic source, by each of the first, second, and third
signal receivers located at the respective first location of each of the first, second, and third signal
receivers, each of the plurality of refracted wavelengths travelling along one of a plurality of first real
ray paths from the sonic source, through an associated geophysical formation to one or more refractors
within the associated geophysical formation, and
then to one of the first, second, and third signal
receivers;
determining a first-shot first virtual wavelength source
having a virtual location in the associated geophysical
formation proximate to the first location of the first
signal receiver by cross-correlating the one or more
first real traces of the first signal receiver with the one
or more first real traces of the second and third signal
receivers;
determining a first-shot second virtual wavelength source
having a virtual location in the associated geophysical
formation proximate to the first location of the second
signal receiver by cross-correlating the one or more
first real traces of the second signal receiver with the
one or more first real traces of the third signal receiver;
determining a second real trace for each of the first,
second, and third signal receivers, the second real
traces being data representing a second plurality of
refracted wavelengths received, from the sonic source,
by each of the first, second, and third signal receivers
located at the respective second location of each of the
first, second, and third signal receivers, each of the
second plurality of refracted wavelengths travelling
along one of a plurality of second real ray paths from
the sonic source, through the associated geophysical
formation to one or more of the refractors within the
associated geophysical formation, and then to one of
the first, second, and third signal receivers;
determining a second-shot first virtual wavelength source
having a virtual location in the associated geophysical
formation proximate to the second location of the first
signal receiver by cross-correlating the one or more
second real traces of the first signal receiver with the
one or more second real traces of the second and third
signal receivers;
determining a second-shot second virtual wavelength
source having a virtual location in the geophysical
formation proximate to the second location of the
second signal receiver by cross-correlating the one or
more second real traces of the second signal receiver
with the one or more second real traces of the third
signal receiver;
establishing one or more virtual traces for each of the
first-shot and second-shot first and second virtual wavelength sources, the one or more virtual traces being data
representing a plurality of virtual refracted wavelengths
originating, virtually, from one or more of the first and
second virtual wavelength sources and received, virtually, by one or more of the first, second, and third signal
receivers;
identifying one or more paths from each of the virtual
wavelength sources to each of the first, second, and
third receivers to define a plurality of virtual ray paths;
identifying each of the plurality of virtual ray paths that
match a portion of at least one of the first real ray paths
and second real ray paths, to define a plurality of
common ray paths;
stacking one or more of the virtual traces and one or more
of each of the first real traces and second real traces that
have common ray paths to cancel out random noise
during a summation of a signal portion of the virtual
traces to define a stacked trace;
determining one or more resulting traces, each of the one
or more resulting traces being configured to initiate at
a location of the sonic source and end at one of the first
and second locations of one of the first, second, and
third signal receivers, the determining of the one or
more resulting traces including convolving one or more
of the virtual traces with one or more of the first real
traces and second real traces, the one or more first real
traces and second real traces each having a ray path
terminating at a location where the virtual trace starts,
to cause a portion of at least one of the virtual traces to
cancel out with a portion of at least one of the first and
second real traces;
stacking each of the resulting traces having common ray
paths to define one or more representative traces, the
representative traces having a representative-trace signal-to-noise ratio greater than a signal-to-noise ratio of
one or more of the first and second real traces and
defining a velocity of at least a portion of the geophysical formation; and
displaying the one or more representative traces on the
display to indicate one or more densities of the geophysical formation to indicate whether hydrocarbons
are present in the geophysical formation.

9. A system as defined by claim 8, wherein the second
location of the first, second, and third signal receivers is
axially offset from the first location of the first, second, and
third signal receivers by the preselected distance.

10. A system as defined by claim 8, wherein the indication of whether hydrocarbons are present in the geophysical formation can be used to determine whether to perforate the wellbore.

11. A system as defined by claim 8, wherein the first shot first virtual wavelength source is kinematically equivalent to the second shot second virtual wavelength source.

12. A system as defined by claim 8, wherein each of the one or more first real traces for each of the first, second, and third signal receivers begins at a time $T_A$, and each of the one or more virtual traces for each of the first-shot first and second virtual wavelength sources begins at one or more times $T_B$, and wherein $T_B-T_A=T_X$, $T_X$ being the time it takes one or more of the plurality of signals to travel from the sonic source to one of the first and second virtual wavelength sources.

13. A system as defined by claim 8, wherein cross-correlation comprises using the formula:

$$r_{virtual}=r_k(t)\otimes r_j(t)=\int_{-\infty}^{\infty}r_j(\tau)r_k(t+\tau)d\tau$$

wherein $r_{virtual}$=one of the first-shot first virtual wavelength source and the first-shot second virtual wavelength source prior to the step of repositioning the sonic tool in the wellbore, and one of the second-shot first virtual wavelength source and the second-shot second virtual wavelength source after the step of repositioning the sonic tool in the wellbore; and $r_k$=the number of one of the first and second signal receivers; $r_j$=the number of one of another one of the second signal receiver and the third signal receiver; t=time; and τ=a placeholder representing a negative time, the negative time being the time it takes the refracted wavelength to travel from one or more of the first, second, and third receivers to one or more of the refractors in the formation.

14. A system as defined by claim 8, wherein convolving each of the stacked traces comprises calculating the resulting trace from the formula:

$$r_k(t)*r_{virtual}(t)=\int_{-\infty}^{\infty}r_k(\tau)r_{virtual}(t-\tau)d^2\tau$$

wherein $r_k$=the number of one of the first and second signal receivers; $r_{virtual}$=the number of one of the first-shot first virtual wavelength source and the first-shot second virtual wavelength source prior to repositioning the sonic tool in the wellbore and one of the second-shot first virtual wavelength source and the second-shot second virtual wavelength source after repositioning the sonic tool in the wellbore; t=time; and τ=a placeholder representing a negative time, the negative time being the time it takes the refracted wavelength to travel from one or more of the first, second, and third receivers to one or more of the refractors in the formation.

15. A method of increasing the signal-to-noise ratio in sonic log data using a sonic tool with first, second, and third signal receivers being equally spaced apart from each other by a preselected distance such that the first signal receiver is the preselected distance from the second signal receiver and the second signal receiver is the preselected distance from the third signal receiver, the preselected distance being between 0.1 meters to 0.2 meters, and a distance from a sonic source to the first signal receiver being at least 3 meters, the method comprising the steps of:

performing a first shot gather with the sonic tool positioned axially in a wellbore at a first location to define a first plurality of real traces representing a plurality of refracted wavelengths, the refracted wavelengths each traveling along one of a plurality of ray paths;

determining a shooting interval distance that is equal to or greater than the preselected distance;

performing a second shot gather with the sonic tool positioned in the wellbore at a second location in a geophysical formation separated from the first location by at least the shooting interval distance to define a second plurality of real traces, the second real traces representing a plurality of refracted wavelengths, the refracted wavelengths each traveling along one of a plurality of ray paths;

cross-correlating each real trace with at least one neighboring corresponding real trace for each of the first and second shot gathers to define a plurality of virtual traces due to a plurality of redatumed virtual sources, the plurality of virtual traces each corresponding to one of a plurality of virtual ray paths;

stacking, by the computer, the virtual traces with common real traces for different shot gathers;

convolving, by the computer, the virtual traces with at least one of the plurality of real traces that corresponds to one of the real ray paths that passes through the virtual source to one of the first, second, and third receivers on the sonic tool;

creating representative traces by stacking the traces having common ray paths; and displaying the representative traces.

16. A method of increasing the signal-to-noise ratio in sonic log data using a sonic tool with first, second, and third signal receivers, the method comprising the steps of:

a. conducting a plurality of shot gathers using a sonic tool comprising a sonic source, a first signal receiver, a second signal receiver, and a third signal receiver, the first, second, and third signal receivers being equally spaced apart from each other by a preselected distance such that the first signal receiver is the preselected distance from the second signal receiver and the second signal receiver is the preselected distance from the third signal receiver, each of the shot gathers of the plurality of shot gathers conducted with the sonic tool positioned at least the preselected distance from the position of the tool for the other of the shot gathers, the preselected distance being between 0.1 meters to 0.2 meters, and a distance from the sonic source to the first signal receiver being at least 3 meters;

b. cross-correlating each of a plurality of real traces obtained via a shot gather of the plurality of shot gathers, each of the plurality of real traces corresponding to a real ray path in a geophysical formation, with at least one neighboring corresponding real trace for each of two others of the plurality of shot gathers to define a plurality of virtual traces;

c. performing a first stacking operation, by the computer, the first stacking operation stacking the virtual traces with respective common real traces;

d. convolving, by the computer, the virtual traces with at least one of the plurality of real traces;

e. performing a second stacking operation, by the computer, the second stacking operation stacking the traces having common ray paths to create representative traces; and f. displaying the representative traces to indicate one or more densities of the geophysical formation.

* * * * *

UNITED STATES PATENT AND TRADEMARK OFFICE
CERTIFICATE OF CORRECTION

PATENT NO. : 9,612,352 B2
APPLICATION NO. : 13/852344
DATED : April 4, 2017
INVENTOR(S) : Al-Shuhail, Al-Dawood and Al-Shuhail It is certified that error appears in the above-identified patent and that said Letters Patent is hereby corrected as shown below:

In Column 20, Line 41, Claim 1, after the word "generating" should read --, from the sonic source of the one or more sonic tools in the second position in the wellbore,--.

Signed and Sealed this
Seventeenth Day of April, 2018

Andrei Iancu
*Director of the United States Patent and Trademark Office*